(12) United States Patent
Otsuka et al.

(10) Patent No.: US 12,378,358 B2
(45) Date of Patent: Aug. 5, 2025

(54) RESIN COMPOSITION, MOLDED BODY, AND THEIR APPLICATION

(71) Applicant: Mitsubishi Gas Chemical Company, Inc., Tokyo (JP)

(72) Inventors: Kosuke Otsuka, Hiratsuka (JP); Takafumi Oda, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 18/441,845

(22) Filed: Feb. 14, 2024

(65) Prior Publication Data

US 2024/0182640 A1    Jun. 6, 2024

Related U.S. Application Data

(63) Continuation of application No. 17/277,698, filed as application No. PCT/JP2019/036546 on Sep. 18, 2019, now abandoned.

(30) Foreign Application Priority Data

Sep. 21, 2018  (JP) .................................. 2018-177574

(51) Int. Cl.
| | | |
|---|---|---|
| *B29C 51/00* | (2006.01) | |
| *B29K 77/00* | (2006.01) | |
| *B32B 1/00* | (2024.01) | |
| *B32B 5/18* | (2006.01) | |
| *B32B 7/12* | (2006.01) | |
| *B32B 27/06* | (2006.01) | |
| *B32B 27/08* | (2006.01) | |
| *B32B 27/10* | (2006.01) | |
| *B32B 27/20* | (2006.01) | |
| *B32B 27/32* | (2006.01) | |
| *B32B 27/34* | (2006.01) | |
| *B32B 29/06* | (2006.01) | |
| *B65D 65/40* | (2006.01) | |
| *C08G 69/26* | (2006.01) | |
| *C08G 69/28* | (2006.01) | |
| *C08J 5/18* | (2006.01) | |
| *C08K 3/34* | (2006.01) | |
| *C08K 7/00* | (2006.01) | |
| *C08L 77/06* | (2006.01) | |
| *B29K 509/00* | (2006.01) | |

(52) U.S. Cl.
CPC .............. *C08G 69/265* (2013.01); *B32B 1/00* (2013.01); *B32B 5/18* (2013.01); *B32B 7/12* (2013.01); *B32B 27/065* (2013.01); *B32B 27/08* (2013.01); *B32B 27/10* (2013.01); *B32B 27/20* (2013.01); *B32B 27/32* (2013.01); *B32B 27/34* (2013.01); *B32B 29/06* (2013.01); *B65D 65/40* (2013.01); *C08G 69/28* (2013.01); *C08J 5/18* (2013.01); *C08K 3/346* (2013.01); *C08K 7/00* (2013.01); *C08L 77/06* (2013.01); *B29C 51/002* (2013.01); *B29K 2077/00* (2013.01); *B29K 2509/00* (2013.01); *B32B 2250/05* (2013.01); *B32B 2250/24* (2013.01); *B32B 2250/40* (2013.01); *B32B 2264/1027* (2020.08); *B32B 2266/0228* (2013.01); *B32B 2307/7244* (2013.01); *B32B 2439/02* (2013.01); *B32B 2439/62* (2013.01); *C08J 2377/06* (2013.01); *C08L 2203/10* (2013.01); *C08L 2203/16* (2013.01); *C08L 2203/30* (2013.01)

(58) Field of Classification Search
CPC ....... C08L 77/06; C08G 69/26; C08G 69/265; C08G 69/32; C08J 2377/06; C08K 2201/006; B32B 27/34; B29K 2077/00; B29K 2077/10; B29L 2031/712; B29L 2031/7132

See application file for complete search history.

(56) References Cited

U.S. PATENT DOCUMENTS

| | | | | |
|---|---|---|---|---|
| 2003/0037831 A1* | 2/2003 | Nakamura | .............. | B32B 27/34 138/177 |
| 2004/0248486 A1* | 12/2004 | Hodson | .................. | D21H 19/14 442/79 |

(Continued)

FOREIGN PATENT DOCUMENTS

| | | | | |
|---|---|---|---|---|
| JP | 2000290500 A | * | 10/2000 | |
| WO | WO-2015100211 A1 | * | 7/2015 | .............. C08J 3/226 |

(Continued)

OTHER PUBLICATIONS

Office Action issued in the corresponding Korean Patent Application No. 10-2021-7006867; dated Jul. 26, 2024; 20 pages.

*Primary Examiner* — Michael C Romanowski
(74) *Attorney, Agent, or Firm* — Fitch, Even, Tabin & Flannery LLP

(57) ABSTRACT

Provided are a resin composition having excellent oxygen barrier property under high humidity as a novel resin material, a molded body, a method for producing a molded body, and a method for producing a pellet using the resin composition. The resin composition includes a resin component and a plate-shaped talc having an aspect ratio of more than 18, 80 mass % of the resin component comprising a barrier resin having an oxygen transmission coefficient of 5.0 cc·mm/(m²·day·atm) or less as measured according to ASTM D3985 at a relative humidity of 60% and a temperature of 23° C., and a content of the plate-shaped talc being from 3.0 to 55.0 mass % when a total of the barrier resin and the plate-shaped talc is 100 mass %.

6 Claims, No Drawings

(56) References Cited

U.S. PATENT DOCUMENTS

| | | | |
|---|---|---|---|
| 2005/0089656 A1* | 4/2005 | Shiina | B65D 65/42 |
| | | | 428/34.2 |
| 2006/0040102 A1* | 2/2006 | Li | C09C 1/28 |
| | | | 106/471 |
| 2009/0026198 A1* | 1/2009 | Ichikawa | B29C 44/3453 |
| | | | 220/62.22 |
| 2009/0277858 A1* | 11/2009 | Mitadera | B65D 1/0215 |
| | | | 215/12.1 |
| 2014/0329950 A1* | 11/2014 | Shimoguchi | B32B 7/12 |
| | | | 524/413 |
| 2019/0256256 A1 | 8/2019 | Kato et al. | |
| 2022/0135755 A1* | 5/2022 | Schirwitz | C08K 3/38 |
| | | | 428/412 |

FOREIGN PATENT DOCUMENTS

| | | | | |
|---|---|---|---|---|
| WO | WO-2017090482 A1 * | 6/2017 | | B32B 27/00 |
| WO | 2018/070157 A1 | 4/2018 | | |

* cited by examiner

RESIN COMPOSITION, MOLDED BODY, AND THEIR APPLICATION

CROSS-REFERENCE TO RELATED APPLICATIONS

This application is a continuation of prior application Ser. No. 17/277,698, filed Mar. 18, 2021, which is a U.S. National Phase application filed under 35 U.S.C. § 371 of International Application Number PCT/JP2019/036546, filed Sep. 18, 2019, designating the United States, which claims priority from Japanese Patent Application Number 2018-177574, filed Sep. 21, 2018.

TECHNICAL FIELD

The present invention relates to a resin composition, a molded body, a container, a multilayer body, a method for producing a molded body, a method for producing a pellet, and a pellet.

BACKGROUND ART

In the prior art, it has been studied to add talc to a thermoplastic resin. For example, Patent Document 1 discloses a polyamide resin composition and a molded body, the polyamide resin composition including from 0.2 to 40 parts by mass of talc with respect to 100 parts by mass of polyamide resin, the talc being composed of (a) untreated talc and (b) treated talc, and the blending ratio (mass ratio) of (a) to (b) being 0.02≤ (b)/(a)≤ 50.

On the other hand, it is also studied to add an inorganic filler to a barrier resin. For example, Patent Document 2 discloses a multilayer structure formed by stretching a multilayer structure twice or longer at least in the uniaxial direction, the multilayer structure being a laminate consisting of a layer including a resin composition (C) containing 100 parts by mass of a barrier resin (A), from 1 to 25 parts by mass of an inorganic filler (B) having a weight average aspect ratio of 5 or more, and/or from 0.5 to 10 parts by mass of a deodorant (F) having a particle size of 0.5 to 10 μm, and a layer including a resin composition (E) containing from 1 to 25 parts by mass of an inorganic filler (B) having a weight average aspect ratio of 5 or more and/or from 0.5 to 10 parts by mass of a deodorant (F) having a particle size from 0.5 to 10 μm with respect to a thermoplastic resin (D) other than the resin (A).

CITATION LIST

Patent Documents

Patent Document 1: JP 2010-070580 A
Patent Document 2: JP 2002-036448 A

SUMMARY OF INVENTION

Technical Problem

As described above, various compositions and molded bodies containing a thermoplastic resin and an inorganic filler have been studied. Further, various performances are exhibited depending on the characteristics and physical properties of the thermoplastic resin and the inorganic filler, and further development is expected.

Based on this situation, an object of the present invention is to provide, as a novel resin material, a resin composition having excellent oxygen barrier property under high humidity, a molded body, a container, a multilayer body, a method for producing a molded body, a method for producing a pellet, and a pellet using the resin composition.

Solution to Problem

As a result of the study by the present inventor based on the above problems, they have found that the above-mentioned problems can be solved by blending a plate-shaped talc with a large aspect ratio into a barrier resin, or by forming a molded body containing a barrier resin and a plate-shaped talc having a large maximum length to minimum width ratio. Specifically, the problems described above are solved by the following means.

<1> A resin composition including a resin component and a plate-shaped talc having an aspect ratio of more than 18, the resin component containing a barrier resin having an oxygen transmission coefficient of 5.0 cc·mm/(m²·day·atm) or less as measured according to ASTM D3985 at a relative humidity of 60% and a temperature of 23° C., and a content of the plate-shaped talc being from 3.0 to 55.0 mass % when a total of the barrier resin and the plate-shaped talc is 100 mass %.

<2> The resin composition according to <1>, in which the content of the plate-shaped talc is more than 15.0 mass % and 35.0 mass % or less of the total of the barrier resin and the plate-shaped talc.

<3> The resin composition according to <1> or <2>, in which the barrier resin includes a polyamide resin.

<4> The resin composition according to <1> or <2>, in which the barrier resin includes a semi-aromatic polyamide resin.

<5> The resin composition according to <1> or <2>, in which the barrier resin comprises a diamine-derived structural unit and a dicarboxylic acid-derived structural unit, and 50 mol % or more of the diamine-derived structural units include a xylylenediamine-based polyamide resin derived from xylylenediamine.

<6> The resin composition according to <5>, in which in the xylylenediamine-based polyamide resin, 70 mol % or more of the diamine-derived structural units are derived from xylylenediamine, and the dicarboxylic acid-derived structural unit includes a structural unit derived from an α,ω-linear aliphatic dicarboxylic acid having from 4 to 20 carbon atoms.

<7> The resin composition according to <5> or <6>, in which in the xylylenediamine-based polyamide resin, 70 mol % or more of the diamine-derived structural units are derived from xylylenediamine, and the dicarboxylic acid-derived structural unit includes an isophthalic acid-derived structural unit.

<8> The resin composition according to any one of <1> to <7>, in which $OTC^{90}/OTC^{60}$, which is the ratio of oxygen transmission coefficient $OTC^{90}$ of the resin composition measured according to ASTM D3985 at a relative humidity of 90% and a temperature of 23° C. to the oxygen transmission coefficient $OTC^{60}$ of the resin composition measured according to ASTM D3985 at a relative humidity of 60% and a temperature of 23° C., is 1.5 or less.

<9> The resin composition according to any one of <1> to <8>, in which $OTC^{90'}/OTC^{90}$, which is the ratio of oxygen transmission coefficient $OTC^{90'}$ of a composition obtained by removing the plate-shaped talc from the resin composition measured according to ASTM D3985 at a relative humidity of 90% and a temperature of 23° C. to the oxygen transmission coefficient $OTC^{90}$ of the resin composition measured according to ASTM D3985 at a relative humidity of 90% and a temperature of 23° C., is 1.5 or more.

<10> A molded body including a resin component and a plate-shaped talc having a maximum length to minimum width ratio $R^{max}$ of more than 9 as measured according to the following conditions, the resin component containing a barrier resin having an oxygen transmission coefficient of 5.0 cc·mm/(m²·day·atm) or less as measured according to ASTM D3985 at a relative humidity of 60% and a temperature of 23° C., and the content of the plate-shaped talc being from 3.0 to 55.0 mass % when the total of the barrier resin and the plate-shaped talc is 100 mass %;

where, the maximum length to minimum width ratio $R^{max}$ of the plate-shaped talc refers to the largest value among $R^0$, $R^{45}$, and $R^{90}$; $R^0$ refers to an average value of the top 1% of the maximum length to minimum width ratios of of the plate-shaped talcs contained in a region having an area of 1200 μm² of an arbitrary cross section in the molded body; $R^{45}$ is an average value of the top 1% of the maximum length to minimum width ratios of the plate-shaped talcs contained in a region of 1200 μm² of a cross section in a 45° direction with respect to the arbitrary cross section in the molded body; and $R^{90}$ refers to an average value of the top 1% of the maximum length to minimum width ratios of the plate-shaped talcs contained in a region of 1200 μm² of a cross section in a 90° direction with respect to the arbitrary cross section in the molded body.

<11> The molded body according to <10>, in which the barrier resin includes a polyamide resin.

<12> The molded body according to <10>, in which the barrier resin includes a semi-aromatic polyamide resin.

<13> The molded body according to <10>, in which the barrier resin comprises a diamine-derived structural unit and a dicarboxylic acid-derived structural unit, and 50 mol % or more of the diamine-derived structural units include a xylylenediamine-based polyamide resin derived from xylylenediamine.

<14> The molded body according to <13>, in which in the xylylenediamine-based polyamide resin, 70 mol % or more of the diamine-derived structural units are derived from xylylenediamine, and the dicarboxylic acid-derived structural unit includes a structural unit derived from an α,ω-linear aliphatic dicarboxylic acid having from 4 to 20 carbon atoms.

<15> The molded body according to <13> or <14>, in which in the xylylenediamine-based polyamide resin, 70 mol % or more of the diamine-derived structural units are derived from xylylenediamine, and the dicarboxylic acid-derived structural unit includes an isophthalic acid-derived structural unit.

<16> The molded body according to any one of <10> to <15>, in which the molded body is formed from the resin composition described in any one of <1> to <9>.

<17> The molded body according to any one of <10> to <16>, which is a film.

<18> A container including the molded body described in any one of <10> to <16>.

<19> A multilayer body including a polyolefin layer and a barrier resin layer, the barrier resin layer being formed from the resin composition described in any one of <1> to <9>, or being the molded body described in any one of <10> to <17>.

<20> A multilayer body including a polyolefin layer, paper, and a barrier resin layer, the barrier resin layer being formed from the resin composition described in any one of <1> to <9>, or being the molded body described in any one of <10> to <17>.

<21> A multilayer body including a resin foam and a barrier resin layer on at least a part of the outside of the resin foam, the barrier resin layer being formed from the resin composition described in any one of <1> to <9>, or being the molded body described in any one of <10> to <17>.

<22> A method for producing a molded body, including molding the resin composition described in any one of <1> to <9>.

<23> The method for producing a molded body according to <22>, in which the molded body is the molded body described in any one of <10> to <17>.

<24> The method for producing a molded body according to <22> or <23>, wherein the molding is thermoforming molding.

<25> A method for producing a pellet, including melting and kneading at least one resin component and a plate-shaped talc with an aspect ratio of more than 18, the resin component containing a barrier resin having an oxygen transmission coefficient of 5.0 cc·mm/(m²·day·atm) or less as measured according to ASTM D3985 at a relative humidity of 60% and a temperature of 23° C., and a content of the plate-shaped talc being from 3.0 to 55.0 mass % when a total of the barrier resin and the plate-shaped talc is 100 mass %.

<26> A pellet formed from the resin composition described in any one of <1> to <9>.

Advantageous Effects of Invention

According to the present invention, it is possible to provide a resin composition having excellent oxygen barrier property under high humidity, a molded body, a container, a multilayer body, a method for producing a molded body, a method for producing a pellet, and a pellet using the resin composition.

DESCRIPTION OF EMBODIMENTS

The contents of the present invention will be described in detail below. Note that in the present specification, "from . . . to . . . " is used to mean that the given numerical values are included as the lower limit and the upper limit, respectively.

The resin composition of the present invention is a resin composition containing a resin component and a plate-shaped talc having an aspect ratio of more than 18, the resin component including a barrier resin having an oxygen transmission coefficient of 5.0 cc·mm/(m²·day·atm) or less as measured according to ASTM D3985 at a relative humidity of 60% and a temperature of 23° C., a content of the plate-shaped talc being from 3.0 to 55.0 mass % when a total of the barrier resin and the plate-shaped talc is 100 mass %. With such a configuration, high oxygen barrier property under high humidity can be achieved. More specifically, in the present invention, the oxygen barrier property of the barrier resin under high humidity can be improved by blending a predetermined talc in a proportion from 3.0 to 55.0 mass % when the total of the barrier resin and the plate-shaped talc is 100 mass %. It is assumed that dispersing the talc with a high aspect ratio in the resin composition allows oxygen molecules to wrap around the talc and permeate the resin composition, so that oxygen molecules permeate the resin composition with a longer path than in the absence of talc, whereby the oxygen barrier property are improved.

<Resin Component>

The resin composition of the present invention includes a barrier resin.

The barrier resin in the present invention refers to a thermoplastic resin having an oxygen transmission coefficient (OTC) of 5.0 cc·mm/(m$^2$·day·atm) or less as measured according to ASTM D3985 at a relative humidity of 60% and a temperature of 23° C.). The oxygen transmission coefficient of the barrier resin is preferably 3.0 cc·mm/(m$^2$·day·atm) or less, preferably 1.0 cc·mm/(m$^2$·day·atm) or less, more preferably 0.5 cc·mm/(m$^2$·day·atm) or less, even more preferably 0.2 cc·mm/(m$^2$·day·atm) or less, and yet even more preferably 0.1 cc·mm/(m$^2$·day·atm) or less. Ideally, the lower limit of the oxygen transmission coefficient at a relative humidity of 60% and a temperature of 23° C. is 0 cc·mm/(m$^2$·day·atm), but may be 0.001 cc·mm/(m$^2$·day·atm) or more, and further, 0.005 cc·mm/(m$^2$·day·atm) or more.

The type of the barrier resin is not particularly specified as long as it satisfies the oxygen transmission coefficient described above, but a polyamide resin, an ethylene-vinyl alcohol copolymer resin (EVOH), and a polyester resin are preferable, and a polyamide resin is more preferable.

The polyamide resin as the barrier resin may be an aliphatic polyamide resin or a semi-aromatic polyamide resin, and is preferably a semi-aromatic polyamide resin. By using the semi-aromatic polyamide resin, the barrier property under high humidity can be further improved.

Examples of the aliphatic polyamide resin include one or more of polyamide 6, polyamide 66, polyamide 46, and polyamide 6/66 (copolymer composed of a polyamide 6 component and a polyamide 66 component).

The semi-aromatic polyamide resin comprises a diamine-derived structural unit and a dicarboxylic acid-derived structural unit, refers to a resin in which from 30 to 70 mol % of the total structural units of the diamine-derived structural units and the dicarboxylic acid-derived structural units are structural units containing an aromatic ring, and is preferably a resin in which from 40 to 60 mol % of the total structural units of the diamine-derived structural units and the dicarboxylic acid-derived structural units are structural units containing an aromatic ring. By using such a semi-aromatic polyamide resin, the mechanical strength of the obtained molded body can be increased. Examples of the semi-aromatic polyamide resin include polyamide 6T, polyamide 9T, polyamide 6I/6T, and xylylenediamine-based polyamide resin described later.

Note that the semi-aromatic polyamide resin is formed from a diamine-derived structural unit and a dicarboxylic acid-derived structural unit, but it does not completely exclude the structural units other than these, and needless to say, it may contain structural units derived from lactams such as ε-caprolactam and laurolactam, and aliphatic aminocarboxylic acids such as aminocaproic acid and aminoundecanoic acid. In the present invention, the total of the diamine-derived structural units and the dicarboxylic acid-derived structural units in the semi-aromatic polyamide resin preferably accounts for 90 mol % or more and more preferably 95 mol % or more of all the structural units.

The polyamide resin as the barrier resin comprises a diamine-derived structural unit and a dicarboxylic acid-derived structural unit, and it is preferable that 50 mol % or more (more preferably 70 mol % or more, even more preferably 80 mol % or more, yet even more preferably 90 mol % or more) of the diamine-derived structural units are a xylylenediamine-based polyamide resin derived from xylylenediamine. The xylylenediamine is usually selected from metaxylylenediamine and/or paraxylylenediamine, in which preferably 30 mol % or more, more preferably 50 mol % or more, even more preferably 70 mol % or more, yet even more preferably 80 mol % or more, and yet even more preferably 90 mol % or more is metaxylylenediamine.

Examples of the diamine that can be used as a raw material diamine component of the xylylenediamine-based polyamide resin, other than m-xylylenediamine and p-xylylenediamine, include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as bis(4-aminophenyl)ether, p-phenylenediamine, and bis(aminomethyl)naphthalene. One type thereof can be used, or two or more types can be mixed and used.

The type of the raw material dicarboxylic acid component of the xylylenediamine-based polyamide resin is not particularly specified, but examples thereof include α,ω-linear aliphatic dicarboxylic acids having from 4 to 20 carbon atoms and dicarboxylic acids other than the α,ω-linear aliphatic dicarboxylic acids having from 4 to 20 carbon atoms, which will be described later.

In the xylylenediamine-based polyamide resin, it is preferable that 70 mol % or more of the diamine-derived structural units are derived from xylylenediamine, and the dicarboxylic acid-derived structural unit includes a structural unit derived from an α,ω-linear aliphatic dicarboxylic acid having from 4 to 20 carbon atoms. It is more preferable that 30 mol % or more of the dicarboxylic acid-derived structural units are structural units derived from an α,ω-linear aliphatic dicarboxylic acid having from 4 to 20 carbon atoms. The dicarboxylic acid other than the α,ω-linear aliphatic dicarboxylic acid having from 4 to 20 carbon atoms may be a dicarboxylic acid described later, but is preferably isophthalic acid.

In the first embodiment of the xylylenediamine-based polyamide resin (hereinafter may be referred to as "xylylenediamine-based polyamide resin (A)"), 70 mol % or more of the diamine-derived structural units are derived from xylylenediamine (preferably metaxylylenediamine), and more than 60 mol % of the dicarboxylic acid-derived structural units are a polyamide resin derived from an α,ω-linear aliphatic dicarboxylic acid having from 4 to 20 carbon atoms. In the first embodiment, of the dicarboxylic acid-derived structural units, more preferably 75 mol % or more, even more preferably 80 mol % or more, yet even more preferably 85 mol % or more, yet even more preferably 90 mol % or more are derived from an α,ω-linear aliphatic dicarboxylic acid having from 4 to 20 carbon atoms.

In the first embodiment, examples of the α,ω-linear aliphatic dicarboxylic acid having from 4 to 20 carbon atoms that is preferably used as the raw material dicarboxylic acid component of the xylylenediamine-based polyamide resin include aliphatic dicarboxylic acids such as succinic acid, glutaric acid, pimelic acid, suberic acid, azelaic acid, adipic acid, sebacic acid, undecanedioic acid, and dodecanedioic acid. These can be used alone or in admixture of two or more, but among these, adipic acid or sebacic acid is more preferable, and adipic acid is even more preferable because the melting point of the polyamide resin is in an appropriate range for molding.

Examples of the dicarboxylic acid component other than the α,ω-linear aliphatic dicarboxylic acid having from 4 to 20 carbon atoms include phthalic acid compounds, such as isophthalic acid, terephthalic acid, and orthophthalic acid; naphthalene dicarboxylic acid isomers, such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used, or two or more types thereof can be mixed and used.

When the xylylenediamine-based polyamide resin (A) contains a dicarboxylic acid component other than the α,ω-linear aliphatic dicarboxylic acid having from 4 to 20 carbon atoms, isophthalic acid is preferable. When the xylylenediamine-based polyamide resin of the first embodiment contains isophthalic acid, the content thereof is in the range of more than 0 mol % and less than 40 mol %, preferably from 1 to 30 mol %, more preferably from 1 to 10 mol %, and even more preferably from 2 to 7 mol % of the dicarboxylic acid-derived structural units.

The polyamide resin used in the first embodiment is usually a crystalline resin. A crystalline resin is a resin having a definite melting point.

In the first embodiment, a small amount of an amorphous polyamide resin may be added to the xylylenediamine-based polyamide resin (A). By adding a small amount of an amorphous polyamide resin, for example, even if molding is performed at a high temperature, the visibility of the contents tends to be further improved.

The second embodiment of the xylylenediamine-based polyamide resin (hereinafter, may be referred to as "xylylenediamine-based polyamide resin (B)") is a polyamide resin in which 70 mol % or more of the diamine-derived structural units are derived from xylylylenediamine (preferably m-xylylenediamine), from 30 to 60 mol % of the dicarboxylic acid-derived structural units are derived from an α,ω-linear aliphatic dicarboxylic acid having from 4 to 20 carbon atoms, and from 70 to 40 mol % are derived from isophthalic acid (wherein the total of the α,ω-linear aliphatic dicarboxylic acid and the isophthalic acid does not exceed 100 mol %). By using such a polyamide resin, the transparency and oxygen barrier property of the obtained molded body can be further improved. The xylylenediamine-based polyamide resin (B) is usually an amorphous resin. The amorphous polyamide resin is a resin having no definite melting point, and specifically, a resin having a crystal melting enthalpy ΔHm of less than 5 J/g, preferably 3 J/g or less, and more preferably 1 J/g or less.

Of all the dicarboxylic acids constituting the dicarboxylic acid-derived structural unit in the xylylenediamine-based polyamide resin of the second embodiment, the lower limit of the proportion of isophthalic acid is preferably 33 mol % or more, more preferably 35 mol % or more, even more preferably 38 mol % or more, yet even more preferably 40 mol % or more, and may be 41 mol % or more. The upper limit of the proportion of isophthalic acid is preferably 67 mol % or less, more preferably 65 mol % or less, even more preferably 62 mol % or less, yet even more preferably 60 mol % or less, and may be 59 mol % or less. Within such a range, the transparency of the resin composition tends to be improved, which is preferable.

Of all the dicarboxylic acids constituting the dicarboxylic acid-derived structural unit in the xylylenediamine-based polyamide resin of the second embodiment, the lower limit of the proportion of the α,ω-linear aliphatic dicarboxylic acid having from 4 to 20 carbon atoms is preferably 33 mol % or more, more preferably 35 mol % or more, even more preferably 38 mol % or more, yet even more preferably 40 mol % or more, and may be 41 mol % or more. The upper limit of the proportion of the α,ω-linear aliphatic dicarboxylic acids having from 4 to 20 carbons is preferably not more than 67 mol %, more preferably not more than 65 mol %, even more preferably not more than 62 mol %, and yet even more preferably not more than 60 mol %, and may be not more than 59 mol %. Within such a range, the oxygen barrier property of the resin composition tends to be further improved.

Examples of the α,ω-linear aliphatic dicarboxylic acid having from 4 to 20 carbon atoms that is preferably used as the raw material dicarboxylic acid component of the xylylenediamine-based polyamide resin include aliphatic dicarboxylic acids, such as succinic acid, glutaric acid, pimelic acid, suberic acid, azelaic acid, adipic acid, sebacic acid, undecanedioic acid, and dodecanedioic acid. Among these, one or a mixture of two or more may be used, but adipic acid or sebacic acid is more preferable, and adipic acid is more preferable because the melting point of the polyamide resin is in an appropriate range for molding.

In the xylylenediamine-based polyamide resin of the second embodiment, of all the dicarboxylic acids constituting the dicarboxylic acid-derived structural unit, the total proportion of the isophthalic acid and the α,ω-linear aliphatic dicarboxylic acid having from 4 to 20 carbon atoms is preferably 90 mol % or more, more preferably 95 mol % or more, even more preferably 98 mol % or more, and may be 100 mol %. With such a proportion, the transparency of the resin composition of the present invention tends to be further improved.

In the xylylenediamine-based polyamide resin of the second embodiment, examples of dicarboxylic acids other than isophthalic acid and a, w-linear aliphatic dicarboxylic acid having from 4 to 20 carbon atoms include terephthalic acid, 2,6-naphthalenedicarboxylic acid, and alicyclic dicarboxylic acid having 6 to 12 carbon atoms. Specific examples of the alicyclic dicarboxylic acid having 6 to 12 carbon atoms include 1,4-cyclohexanedicarboxylic acid and 1,3-cyclohexanedicarboxylic acid.

Ethylene vinyl alcohol copolymer resin (EVOH) as a barrier resin is represented by —[CH$_2$CH$_2$]$_m$—[CH$_2$CH(OH)]$_n$—, and m:n is preferably from 20:80 to 60:40. Examples of commercially available products include Soarnol available from The Nippon Synthetic Chemical Industry Co., Ltd. and Eval available from Kuraray Co., Ltd.

As the polyester resin as the barrier resin, polyethylene terephthalate resin, isophthalic acid copolymer polyethylene terephthalate resin, polybutylene terephthalate resin, polyethylene naphthalate resin, and polyglycolic acid are preferable, and isophthalic acid copolymer polyethylene terephthalate resin is more preferable. Examples of commercially available isophthalic acid copolymerized PET include BK-2180 available from Mitsubishi Chemical Corporation.

In the resin composition of the present invention, the barrier resin may be a main component or a non-main component of the resin component. The main component means that it accounts for 50 mass % or more of the resin component, and the non-main component means that it accounts for less than 50 mass % of the resin component.

In the case of a resin composition containing a barrier resin as a main component of the resin component, the content of the barrier resin is preferably 80 mass % or more, more preferably 85 mass % or more, even more preferably 90 mass % or less, may be 95 mass % or more, further may be 99 mass % or more, and particularly may be 100 mass % of the resin component. The layer formed from the resin composition containing the barrier resin as the main component of the resin component functions as a barrier resin layer having a high oxygen barrier property in the molded body.

In the case of a resin composition containing a barrier resin as a non-main component of the resin component, the content of the barrier resin is preferably 1 mass % or more, and more preferably 5 mass % or more of the resin component. The upper limit value is preferably 30 mass % or less, and more preferably 20 mass % or less. The layer formed from the resin composition containing the barrier resin as the non-main component of the resin component contributes as a component for enhancing the oxygen barrier property of the resin layer formed from the resin composition in the molded body.

The resin composition of the present invention may contain only one type of barrier resin, or may contain two or more types of barrier resin. If two or more types are contained, the total amount is preferably in the above range.

As described above, the resin composition of the present invention may contain a resin other than the barrier resin. A resin other than the barrier resin (non-barrier resin) is a resin having an oxygen transmission coefficient of more than 5.0 cc·mm/(m$^2$·day·atm) as measured according to ASTM D3985 at a relative humidity of 60% and a temperature of 23° C. The non-barrier resin is preferably a thermoplastic resin, and is preferably selected from a polyamide resin, a polycarbonate resin, a polyester resin, a polyolefin resin, an acrylic resin, and a polystyrene resin. Among these, a polyamide resin, a polycarbonate resin, and a polyolefin are preferable.

The polyamide resin used as the non-barrier resin is a polymer having acid amide as a repeating unit, which is obtained by ring-opening polymerization of a lactam, polycondensation of an aminocarboxylic acid, or polycondensation of a diamine and a dibasic acid; Specifically, an aliphatic polyamide resin is preferable, and one or more types of polyamide 610, polyamide 612, polyamide 11, and polyamide 12 are illustrated.

Examples of the polyolefin include one or more types of polyethylene, polypropylene, cyclic olefin polymer (COP), and cyclic olefin copolymer (COC). Among these, polyethylene or polypropylene is preferable, and polypropylene is even more preferable.

The resin composition of the present invention may contain only one type of non-barrier resin, or may contain two or more types.

The resin composition of the present invention preferably contains the resin component in an amount of 45 mass % or more, more preferably 48 mass % or more, and even more preferably 65 mass % or more. The upper limit of the content of the resin component in the resin composition is preferably 97 mass % or less, more preferably 95 mass % or less, even more preferably 92 mass % or less, yet even more preferably 90 mass % or less, and yet even more preferably 85 mass % or less.

<Talc>

The resin composition of the present invention contains a plate-shaped talc. The plate-shaped talc is also called flaky talc, scaly talc, flat talc, or stratiform talc.

The plate-shaped talc contained in the resin composition has an aspect ratio of more than 18. The aspect ratio is preferably 20 or more, more preferably 25 or more, further preferably 30 or more, even more preferably 35 or more, even more preferably 36 or more, and yet even more preferably 38 or more. By setting the aspect ratio to the lower limit or more, the effect that the permeating oxygen molecules and carbon dioxide molecules detour talc is more effectively achieved. The upper limit of the aspect ratio is not particularly specified, but is preferably 60 or less, more preferably 55 or less, even more preferably 51 or less, and yet even more preferably 46 or less. By setting the aspect ratio to the upper limit or less, the secondary processability of the resin composition tends to be improved.

The aspect ratio of the plate-shaped talc is measured by observing the ratio (length/thickness) of the cross section of 50 particles of which cross section can be observed with a scanning electron microscope at a magnification of 2000 to 30000, and arithmetically averaging the ratio of 5 arbitrary particles.

The particle size of (median diameter $D_{50}$) the plate-shaped talc preferably has a lower limit of 1 μm or more, more preferably 2 μm or more, even more preferably 3 μm or more, and yet even more preferably 4 μm or more. By setting the particle size to the lower limit or more, the dispersibility in the resin composition tends to be more excellent. The upper limit of the particle size (median diameter $D_{50}$) of the plate-shaped talc is preferably 20 μm or less, more preferably 18 μm or less, even more preferably 15 μm or less, and yet even more preferably 8 μm or less. By setting the particle size to the upper limit or less, the impact resistance tends to be more excellent.

The particle size (median diameter $D_{50}$) of the plate-shaped talc is measured according to ISO13320.

The specific surface area of the plate-shaped talc preferably has a lower limit of 2.0 m$^2$/g or more, more preferably 4.0 m$^2$/g or more, even more preferably 6.0 m$^2$/g or more, and yet even more preferably 7.5 m$^2$/g or more. By setting the specific surface area to the lower limit or higher, the effect of improving the oxygen gas barrier property by allowing the permeating oxygen molecules and carbon dioxide molecules to detour talc (detour effect) is more effectively achieved. The upper limit of the specific surface area of the plate-shaped talc is preferably 20 m$^2$/g or less, and preferably 18.0 m$^2$/g or less, even more preferably 15.0 m$^2$/g or less, and yet even more preferably 13.0 m$^2$/g or less. By setting the specific surface area to the upper limit or less, the effect of excellent dispersibility in the resin composition can be more effectively achieved.

The specific surface area of the plate-shaped talc is measured according to JIS Z 8830: 2013.

The plate-shaped talc used in the present invention may or may not be surface-treated. In a case of surface treatment, surface treatment by an organic titanate coupling agent, an organic silane coupling agent, a modified polyolefin obtained by grafting an unsaturated carboxylic acid or an anhydride thereof, a fatty acid, a fatty acid metal salt, a fatty acid ester, or a quaternary ammonium salt is preferable, and surface treatment by an organic silane coupling agent is particularly preferable. By surface treatment, the adhesiveness to the resin component tends to be improved.

Specific examples of the surface treatment agent include saturated and/or unsaturated fatty acids such as lauric acid, stearic acid, behenic acid, montanic acid, and erucic acid; their salts of metal such as magnesium, calcium, lithium, zinc, and sodium; ester compounds thereof; maleic acid modified products such as polypropylene maleate, polyethylene maleate, and SEBS maleate; silane-based coupling agents; titanate-based coupling agents or zircoaluminate-based coupling agents.

Especially when the purpose is to improve the adhesiveness, a silane coupling agent is preferable, and specific examples thereof include 3-(2-aminoethyl)aminopropyltrimethoxysilane, γ-glycidoxypropyltrimethoxysilane, β3,4- epoxycyclohexyl)ethyltrimethoxysilane, vinyltriethoxysilane, vinyltriethoxysilane, vinyl-tris(2-methoxyethoxy) silane, γ-methacryloxypropyltrimethoxysilane, γ-aminopropyltrimethoxysilane, N-β-(aminoethyl)-γ-aminopropyldimethoxysilane, γ-mercaptopropyltrimethoxysilane, and γ-chloropropyltrimethoxysilane.

The surface treatment agent is preferably a quaternary ammonium salt, and more preferably a quaternary ammonium salt having at least one alkyl group having 12 or more carbon atoms. Specific examples of quaternary ammonium salts include trimethyl alkyl ammonium salts such as trimethyl dodecyl ammonium salt, trimethyl tetradecyl ammonium salt, trimethyl hexadecyl ammonium salt, trimethyl octadecyl ammonium salt, and trimethyl eicosyl ammonium salt; trimethyl alkenyl ammonium salts such as trimethyl octadecenyl ammonium salt and trimethyl octadecadienyl ammonium salt; triethyl alkyl ammonium salts such as triethyl dodecyl ammonium salt, triethyl tetradecyl ammonium salt, triethyl hexadecyl ammonium salt, and triethyl octadecyl ammonium salt; tributyl alkyl ammonium salts such as tributyl dodecyl ammonium salt, tributyl tetradecyl ammonium salt, tributyl hexadecyl ammonium salt, and tributyl octadecyl ammonium salt; dimethyl dialkyl ammonium salts such as dimethyl didodecyl ammonium salt, dimethyl ditetradecyl ammonium salt, dimethyl dihexadecyl ammonium salt, dimethyl dioctadecyl ammonium salt, and dimethyl ditaroammonium salt; dimethyl dialkenyl ammonium salts such as dimethyl dioctadecenyl ammonium salt and dimethyl dioctadecadienyl ammonium salt; diethyl dialkyl ammonium salts such as diethyl didodecyl ammonium salt, diethyl ditetradecyl ammonium salt, diethyl dihexadecyl ammonium salt, and diethyl dioctadecyl ammonium; dibutyl dialkyl ammonium salts such as dibutyl didodecyl ammonium salt, dibutyl ditetradecyl ammonium salt, dibutyl dihexadecyl ammonium salt, and dibutyl dioctadecyl ammonium salt; methylbenzyl dialkyl ammonium salts such as methylbenzyl dihexadecyl ammonium salt; dibenzyl dialkyl ammonium salts such as dibenzyl dihexadecyl ammonium salt; trialkylmethyl ammonium salts such as tridodecylmethyl ammonium salt, tritetradecylmethyl ammonium salt, and trioctadecylmethyl ammonium salt; trialkylethyl ammonium salts such as tridodecylethyl ammonium salt; trialkylbutyl ammonium salts such as tridodecylbutyl ammonium salt; methyldihydroxyethyl hydrogenated taroammonium salt; ω-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid, and 18-aminooctadecanoic acid. Among these, trimethyl dodecyl ammonium salt, trimethyl tetradecyl ammonium salt, trimethyl hexadecyl ammonium salt, trimethyl octadecyl ammonium salt, dimethyl didodecyl ammonium salt, dimethyl ditetradecyl ammonium salt, dimethyl dihexadecyl ammonium salt, dimethyl dioctadecyl ammonium salt, and dimethylditaroammonium salt are mentioned, and these quaternary ammonium salts can be used alone or as a mixture of multiple types. Further, a quaternary ammonium salt having a glycol group such as polyethylene glycol or propylene glycol may be used.

In the case of surface treatment, the amount of the surface treatment agent is preferably more than 0 mass % and 30 mass % or less of the mass of talc. By setting the amount of the surface treatment agent to 30 mass % or less, deterioration and decomposition of the surface treatment agent due to heat can be effectively suppressed, and as a result, talc aggregation can be effectively suppressed, and the malodor caused by the decomposition products of the surface treatment agent can be suppressed more effectively.

Examples of the surface treatment method include a method of immersing talc powder in a 0.5 to 30 mass % aqueous solution or a water dispersion of the above surface treatment agent, and then heat-treating at 140 to 160° C. for 1 to 2 hours.

Regarding the surface treatment method of talc, the description in JP 2011-073902 A can also be referred to, and this content is incorporated in the present specification. Further, regarding the method of melt-kneading with talc powder, the description of JP 2004-142444 A can also be referred to, and the content thereof is incorporated in the present specification.

The resin composition of the present invention contains the plate-shaped talc in an amount of 3.0 mass % or more, preferably 5.0 mass % or more, more preferably 8.0 mass % or more, even more preferably 10.0 mass % or more, yet even more preferably more than 15.0 mass %, and may be more than 25.0 mass % when the total of the barrier resin and the plate-shaped talc is 100 mass %. The upper limit of the talc content is 55.0 mass % or less, preferably 52.0 mass % or less, and may be 35.0 mass % or less.

The resin composition of the present invention also preferably contains the plate-shaped talc in the composition in an amount of 4.0 vol % or more, more preferably 6.0 vol % or more, even more preferably 8.0 vol % or more, yet even more preferably 12.0 vol % or more, and yet even more preferably 14.0 vol % or more. The upper limit of the content of the plate-shaped talc is preferably 40.0 vol % or less, and may be 30.0 vol % or less, or 20.0 vol % or less.

The resin composition of the present invention may contain only one type of plate-shaped talc, or may contain two or more types. In a case where two or more types are contained, the total amount is preferably in the above range.

<Other Additives>

In addition to the above, the resin composition of the present invention may contain other components. Examples of the other components include adhesive resins, mold release agents, plasticizers, inorganic fillers other than talc, titanium oxide, antioxidants, hydrolysis resistance improvers, matting agents, UV absorbers, nucleating agents other than talc, plasticizers, dispersants, antistatic agents, anticolorants, antigelling agents, and colorants. For these details, the description in paragraphs [0130] to [0155] of JP 4894982 B can be referred to, and the content thereof are incorporated in the present specification. The total amount of these components is preferably 20 mass % or less, more preferably 10 mass % or less, and further preferably 5 mass % or less of the resin composition.

As one embodiment of the resin composition of the present invention, a constitution that is substantially free of an inorganic filler other than talc can be employed. The term "substantially free" means that the content of the inorganic filler other than talc is 10 mass % or less, preferably 5 mass % or less, more preferably 1 mass % or less, even more preferably 0.1 mass % or less of the content of talc, and yet even more preferably null.

The resin composition of the present invention may further contain, or may be substantially free of, glass fibers. The term "substantially free" means that the content of the glass fibers is 10 mass % or less, preferably 5 mass % or less, more preferably 1 mass % or less, even more preferably 0.1 mass % or less of the talc content, and yet even more preferably null.

The resin composition of the present invention may further contain, or may be substantially free of, a swellable layered silicate. The term "substantially free" means that the content of the swellable layered silicate is 10 mass % or less, preferably 5 mass % or less, more preferably 1 mass % or less, even more preferably 0.1 mass % or less of the talc content, and yet even more preferably null. For the swellable layered silicate, the description in paragraphs [0023] to [0027] of JP 2008-239735 A can be referred to, and the content thereof is incorporated in the present specification.

Further, the resin composition of the present invention may further contain, or may be substantially free of, metal oxide particles containing Al. The term "substantially free" means that the content of the metal oxide particles containing Al is 10 mass % or less, preferably 5 mass % or less, more preferably 1 mass % or less, even more preferably 0.1 mass % or less of the talc content, and yet even more preferably null. Examples of the metal oxide particles containing Al include alumina.

Further, the resin composition of the present invention may and may not contain a higher fatty acid having from 4 to 24 carbon atoms and at least one compound selected from metal salts, esters, and amides thereof. Further, the resin composition of the present invention may or may not contain a hydrotalcite compound. Further, the resin composition of the present invention may or may not contain a deodorant (for example, a deodorant having a particle size from 0.5 to 10 μm). For details of the deodorant, the description in paragraphs [0032] to [0034] of JP 2002-036448 A can be referred to, and the content thereof is incorporated in the present specification.

Only one type of each of these components may be used, or two or more types thereof may be used in combination. When two or more types are contained, the total amount is preferably in the above range.

Characteristics of Resin Composition

The resin composition used in the present invention preferably satisfies the following performances. It is more preferable that combination of two or more of the following performances is satisfied.

$OTC^{90}/OTC^{60}$, which is the ratio of the oxygen transmission coefficient $OTC^{90}$ of the resin composition of the present invention measured according to ASTM D3985 at a relative humidity of 90% and a temperature of 23° C. to $OTC^{60}$ of the resin composition, which is an oxygen transmission coefficient measured according to ASTM D3985 at a relative humidity of 60% and a temperature of 23° C., is preferably 5.0 or less, more preferably 3.0 or less, even more preferably 2.5 or less, yet even more preferably 2.2 or less, and yet even more preferably 1.5 or less. The lower limit of $OTC^{90}/OTC^{60}$ is ideally 1.0, and practically 1.01 or more.

$OTC^{80}/OTC^{60}$, which is the ratio of the oxygen transmission coefficient $OTC^{80}$ of the resin composition of the present invention measured according to ASTM D3985 at a relative humidity of 80% and a temperature of 23° C. to $OTC^{60}$ of the resin composition, which is an oxygen transmission coefficient measured according to ASTM D3985 at a relative humidity of 60% and a temperature of 23° C., is preferably 2.2 or less, more preferably 2.0 or less, even more preferably 1.6 or less, and yet even more preferably 1.5 or less. The lower limit of $OTC^{80}/OTC^{60}$ is ideally 1, and practically 1.01 or more.

$OTC^{90'}/OTC^{90}$, which is the ratio of the oxygen transmission coefficient $OTC^{90'}$ of the composition obtained by removing the plate-shaped talc from the resin composition measured according to ASTM D3985 at a relative humidity of 90% and a temperature of 23° C. to the oxygen transmission coefficient $OTC^{90}$ of the resin composition measured according to ASTM D3985 at a relative humidity of 90% and a temperature of 23° C., is preferably 1.5 or more, more preferably 2.1 or more, even more preferably 2.5 or more, yet even more preferably 3.5 or more, and yet even more preferably 6.0 or more. The upper limit value is not particularly specified, but for example, even if it is 20.0 or less, further 15.0 or less, the required performance is sufficiently satisfied.

<Method for Producing Resin Composition>

Any method is adopted as the method for producing the resin composition of the present invention.

Examples thereof include a method of mixing the resin component, the plate-shaped talc and the other components using a mixing means such as a V-type blender to prepare a batch blend product, and then melt-kneading and pelletizing it with a vented extruder. Other example is a two-step kneading method in which components other than plate-shaped talc are sufficiently mixed in advance, then melt-kneaded with a vented extruder to produce pellets, and the pellets and plate-shaped talc are mixed and then melt-kneaded with a vented extruder.

Other example is a method in which components other than plate-shaped talc are sufficiently mixed in advance with a V-type blender or the like, supplied from a first chute of a vented twin-screw extruder, the plate-shaped talc is supplied from a second chute in the middle of the extruder, and these components are melt-kneaded and pelletized.

Regarding the screw configuration of the kneading zone of the extruder, it is preferable that an element that promotes kneading is arranged on the upstream side and an element having a boosting ability is arranged on the downstream side. Examples of the element that promotes kneading include a progressive kneading disc element, an orthogonal kneading disc element, a wide kneading disc element, and a progressive mixing screw element.

The heating temperature for melt-kneading can be appropriately selected from the range from 160 to 350° C. depending on the melting point for the crystalline resin, and from the range of 160 to 350° C. depending on the glass transition temperature for the amorphous resin. If the temperature is too high, decomposition gas is likely to be generated, which may cause yellowing. Therefore, it is desirable to select a screw configuration that takes into consideration shear heat generation and the like. In addition, it is desirable to use an antioxidant or a heat stabilizer from the viewpoint of suppressing decomposition during kneading and molding in the subsequent process.

Further, when the crystalline resin and the amorphous resin are blended, the heating temperature can be appropriately selected from the range from 160 to 350° C.

The present invention also discloses a method for producing pellets including mixing and melt-kneading a plate-shaped talc having an aspect ratio of more than 18 with at least one of the resin components, the resin component containing a barrier resin having an oxygen transmission coefficient of 5.0 cc·mm/(m²·day·atm) or less as measured according to ASTM D3985 at a relative humidity of 60% and a temperature of 23° C., and the content of the plate-shaped talc being from 3.0 to 55.0 mass % when the total of the barrier resin and the plate-shaped talc is 100 mass %.

An example of the embodiment of the method for producing pellets of the present invention is an embodiment in which a xylylenediamine-based polyamide resin and a plate-shaped talc are melt-kneaded to obtain pellets. The pellets may be further blended with other pellets.

The present invention also discloses a pellet formed from the resin compositions of the present invention. The pellet of the present invention preferably contains a plate-shaped talc having a maximum length to minimum width ratio $R^{max}$ of more than 9. For details of this, the description of the molded body described later can be taken into consideration.

<Molded Body>

The present invention also discloses a molded body including a plate-shaped talc and a resin component and plate-shaped talc with a maximum length to minimum width ratio $R^{max}$ of more than 9 as measured according to the following conditions, the resin component including a barrier resin having an oxygen transmission coefficient of 5.0 cc·mm/(m²·day·atm) or less as measured according to ASTM D3985 at a relative humidity of 60% and a temperature of 23° C., and the content of the plate-shaped talc being from 3.0 to 55.0 mass % when the total of the barrier resin and the plate-shaped talc is 100 mass %.

Here, the maximum length to minimum width ratio $R^{max}$ of the plate-shaped talc refers to the largest value among $R^0$, $R^{45}$, and $R^{90}$; $R^0$ refers to an average value of the top 1% of the maximum length to minimum width ratios of the plate-shaped talcs contained in a region having an area of 1200 µm² of an arbitrary cross section in the molded body; $R^{45}$ is an average value of the top 1% of the maximum length to minimum width ratios of the plate-shaped talcs contained in a region of 1200 µm² of a cross section in a 45° direction with respect to the arbitrary cross section in the molded body; and $R^{90}$ refers to an average value of the top 1% of the maximum length to minimum width ratios of the plate-shaped talcs contained in a region of 1200 µm² of a cross section in a 90° direction with respect to the arbitrary cross section in the molded body.

<<Resin Component and Barrier Resin>>

The resin component, the barrier resin, their contents in the molded body, and the contents relative to the plate-shaped talc are synonymous with those described for the resin composition, and the preferable ranges are also the same.

<<Plate-Shaped Talc>>

The plate-shaped talc included in the molded body has a maximum length to minimum width ratio $R^{max}$ of more than 9 as measured according to a predetermined condition. By dispersing such talc in the resin component, the plate-shaped talc having a large aspect ratio is sufficiently present in the molded body. Then, the oxygen molecule wraps around the talc having a large aspect ratio and permeates the resin composition, and the barrier property can be improved as compared with the case where the plate-shaped talc having a large aspect ratio does not exist.

Here, the maximum length to minimum width ratio $R^{max}$ of the plate-shaped talc refers to the largest value among $R^0$, $R^{45}$, and $R^{90}$. $R^0$ refers to an average value of the top 1% of the maximum length to minimum width ratios of the plate-shaped talcs contained in a region having an area of 1200 µm² of an arbitrary cross section in the molded body; $R^{45}$ is an average value of the top 1% of the maximum length to minimum width ratios of the plate-shaped talcs contained in a region of 1200 µm² of a cross section in a 45° direction with respect to the arbitrary cross section in the molded body; and $R^{90}$ refers to an average value of the top 1% of the maximum length to minimum width ratios of the plate-shaped talcs contained in a region of 1200 µm² of a cross section in a 90° direction with respect to the arbitrary cross section in the molded body. Here, the "top" means a large maximum length to minimum width ratio.

Here, the plate-shaped talc is desirably cut in the direction in which the aspect ratio is highest (hereinafter, referred to as "high aspect ratio") in the cross section of the molded body. However, when cut at an arbitrary cross section, the plate-shaped talc may not be cut in a high aspect direction. At least, the average of the maximum length to minimum width ratio R in the cross section is considered to be significantly smaller than the average of the aspect ratio of the plate-shaped talc. Under such circumstances, in the present invention, by setting the average value of the top 1% of the maximum length to minimum width ratio of the plate-shaped talc in a predetermined range, the distribution of the aspect ratio of the plate-shaped talc having a high aspect ratio in the molded body is reflected. The aspect ratio of the plate-shaped talc has a distribution, but it is presumed that a higher ratio $R^{max}$ and a higher content of the plate-shaped talc provide more effective detour effect of the plate-shaped talc and an improved gas barrier property.

In the present invention, the maximum length to minimum width ratio $R^{max}$ of the plate-shaped talc in the molded body is obtained by measuring the maximum length and the minimum width of the plate-shaped talc particles in the cross section of the molded body, and calculating the ratio (maximum length/minimum width). In the cross section of the molded body, it is unlikely that the cut surface passes through the portion of the plate-shaped talc having the highest aspect ratio. On the other hand, it is estimated that by cutting the molded body in an appropriate direction, the maximum length to minimum width ratio $R^{max}$ of some plate-shaped talc is cut at a portion relatively close to the portion having the highest aspect ratio. Therefore, as described above, the maximum length to minimum width ratio of the plate-shaped talc, $R^0$, $R^{45}$, and $R^{90}$ are observed for the cross sections in three directions. In the distribution of the obtained maximum length to minimum width ratio $R^{max}$, the number average value of the top of the aspect ratios is calculate as the maximum length to minimum width ratio $R^{max}$. As a result, although the value is smaller than the actual aspect ratio of the plate-shaped talc in the molded body, it is considered that a value correlated with the aspect ratio can be obtained.

In the process of compounding of plate-shaped talc, extrusion, and molding, a portion of the talc may be broken into small pieces, and it is likely difficult to distinguish the cross section of such plate-shaped talc from the cross section of the edge of plate-shaped talc having a high aspect ratio. However, at least the proportion of plate-shaped talc having a high aspect ratio, which is expected to exert a good detour effect, can be evaluated from the maximum length to minimum width ratio $R^{max}$.

As described above, the plate-shaped talc has a maximum length to minimum width ratio $R^{max}$ of more than 9. The maximum length to minimum width ratio $R^{max}$ is preferably 9.5 or more, more preferably 10.0 or more, even more preferably 10.7 or more, yet even more preferably 11.5 or more, yet even more preferably 12.5 or more, and yet even more preferably 13.5 or more. By setting the ratio to the lower limit or more, the effect that the permeating oxygen molecules detour the talc is more effectively achieved. The upper limit of the maximum length to minimum width ratio $R^{max}$ is not particularly specified, but is preferably 50 or less, more preferably 40 or less, even more preferably 35 or less, and yet even more preferably 30 or less. By setting the ratio to the upper limit or less, the secondary processability of the resin composition and the molded body tends to be improved.

The proportion X of the number of particles of plate-shaped talc having a maximum length to minimum width ratio R of more than 9 can be calculated by the following equation in the observed cross section in which the maximum length to minimum width ratio $R^{max}$ is obtained.

(Proportion X of number of particles of plate-shaped talc having a maximum length to minimum width ratio R of more than 9) [%]=(Number of particles of plate-shaped talc having a maximum length to minimum width ratio R of more than 9)/(Total number of particles of plate-shaped talc)×100

The proportion X is preferably 0.5% or more, more preferably 2.0% or more, even more preferably 3.0% or more, yet even more preferably 4.0% or more, yet even more preferably 5.5% or more, and yet even more preferably 7.0% or more. The upper limit of the proportion X of the number of particles of the plate-shaped talc having the maximum length to minimum width ratio $R^{max}$ of more than 9 is not particularly specified, but is preferably 40% or less, more preferably 30% or less, even more preferably 25% or less, yet even more preferably 20% or less, and further may be 15% or less, 10% or less, 9% or less, and 8% or less. By setting the proportion to the upper limit or less, the secondary processability of the resin composition and the molded body tends to be improved.

The specific surface area, surface treatment, and the content (mass ratio, volume ratio) of the plate-shaped talc contained in the molded body of the present invention are synonymous with those of the plate-shaped talc contained in the resin composition, and the preferred range is the same.

Further, the molded body of the present invention may contain other additives in addition to the resin component and plate-shaped talc. The details of the other additives are also synonymous with the other additives that may be contained in the resin composition, and the preferable range is also the same.

The method for producing the molded body of the present invention is not particularly specified, but it is preferably formed from the resin composition of the present invention. By using the resin composition of the present invention, the maximum length to minimum width ratio $R^{max}$ of the plate-shaped talc can be set in the above range without using a special melt-kneading method. Needless to say, the molded body of the present invention may be formed from a material other than the resin composition of the present invention.

<Use of Molded Body>

The molded body of the present invention may be used as a molded article consisting of the molded body, or may be used as a molded article in combination of the molded body with other members. Further, the molded article does not have to be a final product, and may be a part or a member constituting a part of the final molded article. The molded article can be used for all applications that require oxygen barrier properties, particularly oxygen barrier properties under high humidity.

In the molded article of the present invention, the molded body of the present invention (meaning including film-shaped and sheet-shaped molded bodies, the same applies hereinafter) may be used as at least a part of a packaging material, and it can also be used as at least part of a container such as bottles, trays, cups, tubes, various pouches such as flat bags and standing pouches.

When the molded body of the present invention is a film, the thickness is preferably from 1 to 100 μm, and more preferably from 2 to 80 μm.

The molded article may have a single-layer structure of a layer made of the resin composition of the present invention or a layered (film-shaped) molded body of the present invention, and may be a multilayer body in which another layer, for example, a layer made of a thermoplastic resin is combined. Examples of the thermoplastic resin in the case of a multilayer body include polyolefin resin, polyester resin, polyamide resin, ethylene/vinyl alcohol copolymer resin, polyvinyl alcohol resin, and adhesive resin.

The methods for producing the molded body and the molded article are not particularly limited, and any method may be used.

Specific examples include a method for obtaining a container such as a tray or a cup or a sheet-shaped packaging material by thermoforming such as vacuum forming, compressed air forming, compressed air vacuum forming, or press forming, and a production method of injecting a molten resin composition into a mold from an injection molding machine.

The film-shaped packaging material or the tube-shaped packaging material can be molded by extruding the molten resin composition through a T-die, a circular die, or the like from an attached extruder.

Further, the molded body of the present invention may or may not be stretched, and preferably not stretched. Examples of the method for producing a molded body without stretching include direct blow molding, compressed air vacuum forming, paper laminating, and compression forming.

Needless to say, packaging materials and containers can be produced by various methods other than the above-mentioned manufacturing methods.

The molded article of the present invention, for example, a packaging material or a container, is suitable for storing and preserving various articles. For example, the molded article can store various articles such as beverages, seasonings, cereals, liquid and solid products that require aseptic filling or heat sterilization, chemicals, liquid daily necessities, pharmaceuticals, semiconductor integrated circuits, and electronic devices. For details thereof, refer to the descriptions in paragraphs [0032] to [0035] of JP 2011-37199 A, the contents of which are incorporated herein.

Hereinafter, preferred embodiments of the molded article of the present invention will be described. Of course, the present invention is not limited to these molded articles.

A first embodiment of the molded article of the present invention is a direct blow molded article. The direct blow molded article may be a single-layer molded body or a multilayer body, but is preferably a single-layer body. For example, exemplified is an embodiment in which the resin composition of the present invention or the resin composition of the present invention and other material are subjected to direct blow molding. Also exemplified is an embodiment in which the molded body of the present invention or a molded article containing the molded body of the present invention is formed by direct blow molding. The direct blow molded article may consist only of the resin composition or the molded body of the present invention, or may be a molded article containing other components.

Examples of the direct blow molded article include a bottle.

When used in a direct blow molded article, the resin composition or molded body of the present invention preferably contains a total of from 2 to 35 mass % of the barrier resin and the plate-shaped talc, from 1 to 35 mass % of the adhesive resin, and from 60 to 97 mass % of the polyolefin.

When used in a direct blow molded article, the barrier resin comprises a diamine-derived structural unit and a dicarboxylic acid-derived structural unit, in which 50 mol % or more of the diamine-derived structural units are preferably a xylylenediamine-based polyamide resin derived from xylylenediamine, and more preferably the above-mentioned xylylenediamine-based polyamide resin (A). Only one type of barrier resin may be used, or two or more types may be used.

The adhesive resin preferably includes an adhesive thermoplastic resin. Examples of the adhesive thermoplastic resin include acid-modified polyolefin resins obtained by modifying polyolefin resins such as polyethylene and polypropylene with unsaturated carboxylic acids such as acrylic acid, methacrylic acid, maleic acid, maleic anhydride, fumaric acid, and itaconic acid. As the adhesive resin, one or more types of acid-modified polyolefin resins are preferable. From the viewpoint of adhesiveness, the adhesive resin is preferably a modified resin of the same type as polyolefin.

Examples of the polyolefin include polyethylene, polypropylene, cyclic olefin polymer (COP), and cyclic olefin copolymer (COC). Among these, polyethylene and polypropylene are preferable, and high density polyethylene (HDPE) is particularly preferable.

High-density polyethylene (HDPE) is polyethylene having a density of 0.942 g/cm$^3$ or more, and preferably 0.945 g/cm$^3$ or more. The upper limit of the density is preferably 0.97 g/cm$^3$ or less, and more preferably 0.960 g/cm$^3$ or less.

By increasing the density of polyethylene, its crystallinity becomes more sufficient, and the contents tend to be easily stored regardless of the type of contents stored in the container. Additionally, by setting the density to 0.970 g/cm$^3$ or less, polyethylene is less likely to become brittle like glass, and higher strength can be exhibited as a container.

The adhesive resin can be used alone or as a mixture of two or more types. As one embodiment, exemplified is an embodiment in which 90 mass % or more, more preferably 95 mass % or more, still more preferably 100 mass % of the adhesive resin, is a single high-density polyethylene.

When the resin composition of the present invention is used for molding a direct blow bottle, it has an excellent barrier property against contents such as flavoring agents and organic solvents, and can be expected to have an effect of suppressing fragrance leakage and volatilization of organic solvents. Examples of the flavoring agent include limonene, menthol, vanillin, and cis-3-hexenal diethyl acetal.

A second embodiment of the molded article of the present invention is a compressed air vacuum molded article. The compressed air vacuum molded article may be a single-layer body or multilayer body, but is preferably a multilayer body. In other words, exemplified is an embodiment including a compressed air vacuum molded article obtained by compressed air vacuum forming the resin composition of the present invention or the resin composition of the present invention and other material. Also exemplified is an embodiment in which the molded body of the present invention or a molded article containing the molded body of the present invention is formed by compressed air vacuum forming. The compressed air vacuum molded article may consist only of the resin composition or the molded body of the present invention, or may be a molded article containing other components.

Examples of the compressed air vacuum molded article include containers such as cups, trays, and cooked rice containers.

When the compressed air vacuum molded article is a multilayer body, exemplified is a multilayer body having a polyolefin layer and a barrier resin layer, the barrier resin layer being formed from the resin composition of the present invention or being the molded body of the present invention. More specific examples of the layer constitution of the multilayer body include a polyolefin layer/an adhesive resin layer/a barrier resin layer/an adhesive resin layer/a polyolefin layer. Other examples include the layer constitution described in WO2013/002076.

Examples of the polyolefin and the adhesive resin include the polyolefin and the adhesive resin described for the first embodiment of the molded body of the present invention.

The first embodiment of the barrier resin layer when used in a compressed air vacuum molded article is an embodiment containing the above-mentioned xylylenediamine-based polyamide resin (A) and an amorphous polyamide resin as resin components. More preferably, the first embodiment of the barrier resin layer preferably includes from 70 to 98 mass % of the xylylenediamine-based polyamide resin (A) and from 2 to 30 mass % of an amorphous polyamide resin, more preferably includes from 75 to 90 mass % of the xylylenediamine-based polyamide resin (A) and from 10 to 25 mass % of an amorphous polyamide resin, and even more preferably includes from 80 to 90 mass % of the xylylenediamine-based polyamide resin (A) and from 10 to 20 mass % of an amorphous polyamide resin. By employing such a blend form, the molding temperature can be set to, for example, Tg+60° C. to Tg+120° C. of the above-mentioned xylylenediamine-based polyamide resin (A). With such a configuration, the visibility of the contents tends to be further improved even when molding is performed at a high temperature, for example. Examples of the amorphous polyamide resin include the above-mentioned xylylenediamine-based polyamide resin (B), polyamide 6I, polyamide 6T, polyamide 6IT, and polyamide 6I/6T. Among these, the above-mentioned xylylenediamine-based polyamide resin (B) and polyamide 6I/6T are preferable. The first embodiment of the barrier resin layer is preferably formed from a resin composition in which the total of the resin component and the plate-shaped talc accounts for 90 mass % or more (more preferably 95 mass % or more).

The second embodiment of the barrier resin layer when used in a compressed air vacuum molded article is an embodiment in which the above-mentioned xylylenediamine-based polyamide resin (B) is used as a main component as a resin component. By using a xylylenediamine-based polyamide resin containing an isophthalic acid component, the crystallization rate is slowed down and better molding is possible. Further, the barrier property under high humidity can be further improved. The second embodiment of the barrier resin layer is preferably formed from a resin composition in which the total of the resin component and the plate-shaped talc accounts for 90 mass % or more (more preferably 95 mass % or more).

A third embodiment of the molded article of the present invention is a paper laminate. An example is a multilayer body including a polyolefin layer, paper, and a barrier resin layer, in which the barrier resin layer is formed from the resin composition of the present invention or is a molded body of the present invention. Examples of the paper laminate include a paper laminate multilayer film and a paper laminate container, and a paper laminate container is preferable.

When used for a paper laminate, the resin composition or molded body of the present invention is preferably a resin composition in which the total of the barrier resin and the plate-shaped talc accounts for 90 mass % or more (more preferably 95 mass % or more).

When used for paper laminating, the barrier resin is preferably a xylylenediamine-based polyamide resin in which 70 mol % or more of the diamine-derived structural units are derived from xylylenediamine, and the dicarboxylic acid-derived structural unit contains an isophthalic acid-derived structural unit, and is more preferably the above-mentioned xylylenediamine-based polyamide resin (B). Only one type of barrier resin may be used, or two or more types may be used. By using a xylylenediamine-based polyamide resin containing an isophthalic acid component, the crystallization rate is slowed down and better molding is possible. Further, the barrier property under high humidity can be improved.

The paper laminate is a multilayer body, and examples thereof include a molded body having a polyolefin layer, paper, and a barrier resin layer, the barrier resin layer being a layer formed from the resin composition. Examples of the layer constitution of the multilayer body include a polyolefin layer/paper/a barrier resin layer/an adhesive resin layer/a polyolefin layer, and a polyolefin layer/paper/a polyolefin layer/an adhesive resin layer/a barrier resin layer/an adhesive resin layer/a polyolefin layer. Examples of the polyolefin and the adhesive resin include the polyolefin and the adhesive resin described for the first embodiment of the molded body of the present invention.

Since the paper base material layer of the paper laminate is a basic material constituting the container, it preferably has shapeability, bending resistance, rigidity, waist, strength, and the like, and may use, for example, bleached or unbleached paper base material having strong sizing property, or pure white roll paper, kraft paper, paperboard, processed paper, and various other paper base materials.

The paper base material layer preferably has a basis weight in the range of about 80 to 600 g/m², and more preferably has a basis weight in the range from 100 to 450 g/m². In the present invention, for example, characters, figures, patterns, symbols, and other desired printed patterns may be arbitrarily formed on the paper base material layer by a normal printing method.

In addition to the above, the details of the paper laminate can be referred to in JP 2004-268441 A and WO 2013/002078, as long as the spirit of the present invention is not deviated, and these contents are incorporated herein by reference.

A fourth embodiment of the molded article of the present invention is a film for film laminating a resin foam multilayer body. That is, exemplified is a multilayer body including a resin foam and a barrier resin layer arranged on at least a part of the outside of the resin foam, the barrier resin layer being formed from the resin composition of the present invention or being the molded body of the present invention. In this way, by providing the barrier resin layer on at least a part of the outside of the resin foam, it is possible to effectively suppress the gas in the resin foam from being released or replaced with air, and the heat insulating performance is maintained for a long time. The phrase "including a barrier resin layer arranged on at least a part of the outside of the resin foam" means that the barrier resin layer directly or indirectly covers at least a part of the surface of the resin foam.

Examples of the resin foam multilayer body include a multilayer body in which a barrier resin layer is laminated on a resin foam, and a multilayer heat insulating material in which a barrier resin layer is laminated on the resin foam. Among these, a multilayer heat insulating material in which a barrier resin layer is laminated on the resin foam is preferable. In particular, the heat insulating material is preferably a heat insulating material for construction.

The resin foam multilayer body is preferably a processed product in which a barrier resin layer is laminated on one side of the resin foam layer and a processed product in which a barrier resin layer is laminated on both sides of the resin foam layer, and more preferably a processed product in which a barrier resin layer is laminated on both sides of the resin foam layer.

The heat insulating performance of the resin foam is enhanced by foaming a base resin with a gas having a low thermal conductivity when molding. However, after molding the resin foam, by gradually dissipating the gas having a low thermal conductivity, and by permeating air having a higher thermal conductivity than the gas into the resin foam, the thermal conductivity of the obtained resin foam may gradually increase. As a method for solving these problems, it is effective to use a barrier resin layer on the surface layer of the resin foam to suppress the dissipation of gas having low thermal conductivity and suppress the permeation of air. That is, by laminating the barrier resin layer on the resin foam, the gas barrier property of the obtained resin foam multilayer body can be improved.

When used for a film for film lamination of a resin foam multilayer body, the resin composition or molded body of the present invention is preferably a resin composition in which the total of the barrier resin and the plate-shaped talc accounts for 90 mass % or more (more preferably 95 mass % or more).

When used for a film for film lamination of a resin foam multilayer body, the barrier resin is preferably a xylylenediamine-based polyamide resin in which 70 mol % or more of the diamine-derived structural units are derived from xylylenediamine, and the dicarboxylic acid-derived structural unit contains an isophthalic acid-derived structural unit, and is more preferably the above-mentioned xylylenediamine-based polyamide resin (B). Only one type of barrier resin may be used, or two or more types may be used. By using a xylylenediamine-based polyamide resin containing an isophthalic acid component, the crystallization rate is slowed down and better molding is possible. Further, the barrier property under high humidity can be improved.

More specifically, exemplified is a resin foam multilayer body which is a multilayer body including a resin foam layer and a barrier resin layer, the barrier resin layer being a layer or a molded body formed from the resin composition. Examples of the layer constitution of the multilayer body include a barrier resin layer (a layer formed from the resin composition of the present invention)/a foam resin layer/a barrier resin layer (a layer formed from the resin composition of the present invention). Examples of the method of laminating the barrier resin layer on the resin foam layer include simultaneous extrusion of the resin foam layer and the barrier resin layer, and a method of laminating the resin foam layer and the barrier resin layer (film) by a laminating method. Examples of the laminating method include a hot melt lamination method, a wet lamination method, a dry lamination method, a solvent-free dry lamination method, an extrusion lamination method, and a thermal lamination method.

When performing the film lamination method, as necessary, for example, pretreatments such as corona treatment and ozone treatment may be applied to the film, and additionally, for example, known anchor coating agents such as isocyanate-based (urethane-based), polyethyleneimine-based, polybutadiene-based, and organic titanium-based anchor coating agents, or known adhesives such as polyurethane-based, polyacrylic-based, polyester-based, epoxy-based, polyvinyl acetate-based, and cellulose-based adhesives for lamination can be used.

The thickness of the barrier resin layer is preferably 3 μm or more, more preferably 7 μm or more, and even more preferably 10 μm or more. By adopting such a thickness of the barrier resin layer, it is possible to suppress the outflow and volatilization of the gas having a low thermal conductivity present in the resin foam and the inflow of air into the foam, and to suppress an increase in thermal conductivity over time. The upper limit of the thickness of the barrier resin layer is preferably 100 μm or less, and may be 50 μm or less, or 30 μm or less.

The timing for laminating the barrier resin layer is, on the premise that the cutting treatment for adjusting the shape of the foam has been performed, preferably within at least one month after the production of the foam, more preferably within two weeks after the production of the foam, and even more preferably immediately after the foam is produced and cut. By setting such timing for lamination, it is possible to suppress the outflow and volatilization of the gase having a low thermal conductivity present in the resin foam and the inflow of air into the foam, and a resin foam multilayer body having a low thermal conductivity can be obtained.

The thickness of the resin foam (resin foam layer) is preferably 8 mm or more, more preferably 10 mm or more, and even more preferably 15 mm or more. By setting the thickness in such a range, higher heat insulating performance can be obtained. The thickness of the resin foam (resin foam layer) is preferably 200 mm or less, and may be 150 mm or less, or 120 mm or less. By setting the thickness in such a range, the process window for foam molding is wider, and foam molding is easier.

The apparent density of the resin foam is preferably 10 kg/cm$^3$ or more, more preferably 15 kg/cm$^3$ or more, and even more preferably 20 kg/cm$^3$ or more. By setting the apparent density in such a range, the mechanical strength of the resin foam multilayer body is increased. The apparent density of the resin foam is preferably 80 kg/cm$^3$ or less, more preferably 65 kg/cm$^3$ or less, and even more preferably 50 kg/cm$^3$ or less. By setting the apparent density in such a range, the resin foam multilayer body can obtain high heat insulation and light weight.

Examples of the resin foam include a resin foam continuously produced by heating and melting a styrene resin with an extruder or the like, then adding a foaming agent, cooling the resin, and extruding the resin into a low pressure region.

The styrene resin used in the resin foam is not particularly limited, and examples thereof include styrene homopolymer, styrene-acrylate copolymer, styrene-methacrylate copolymer, styrene-acrylic acid copolymer, styrene-methacrylic acid copolymer, styrene-maleic anhydride copolymer, styrene-polyphenylene ether copolymer, styrene-butadiene copolymer, styrene-acrylonitrile copolymer, acrylonitrile-butadiene-styrene copolymer, acrylonitrile-styrene acrylate copolymer, styrene-methylstyrene copolymer, styrene-dimethylstyrene copolymer, styrene-ethylstyrene copolymer, styrene-diethylstyrene copolymer containing styrene as the main component, and high impact polystyrene (impact resistant polystyrene resin). These are used alone or in admixture of two or more. The content of the styrene component in the styrene-based copolymer is preferably 50 mol % or more, and particularly preferably 80 mol % or more.

Among the above polystyrene resins, styrene homopolymer, styrene-acrylate copolymer, styrene-methacrylate copolymer, styrene-acrylic acid copolymer, styrene-methacrylic acid copolymer, styrene-maleic anhydride copolymer, styrene-polyphenylene ether copolymer, styrene-acrylonitrile copolymer, and styrene-methylstyrene copolymer are preferable. Among these, styrene homopolymer, styrene-methacrylate copolymer, and styrene-acrylate copolymer are preferable.

Examples of the foaming agent used in the resin foam include hydrofluoroolefins (HFOs), which have extremely low ozone depletion potentials and low global warming potentials, hydrocarbon-based foaming agents with relatively low gas transmission rates for styrene, foaming agents with relatively high gas transmission rates for styrene, and a foaming agent that is a mixture of two or more of these.

Examples of the HFO include trans-1,3,3,3-tetrafluoropropene (trans HFO-1234ze), cis-1,3,3,3-tetrafluoropropene (cis HFO-1234ze), 1,1,1,2-tetrafluoropropene (HFO-1234yf). Among these, trans-1,3,3,3-tetrafluoropropene is particularly preferable. These foaming agents may be used alone or in combination of two or more.

Examples of hydrocarbon-based foaming agents having a relatively low gas transmission rate for styrene include saturated hydrocarbons having 3 to 5 carbon atoms such as propane, normal butane, isobutane, normal pentane, isopentane, neopentane cyclobutane, and cyclopentane. Among these, isobutane is particularly preferable. These foaming agents may be used alone or in combination of two or more.

Examples of the foaming agent having a relatively high gas transmission rate for styrene include alkyl halides (for example, alkyl chloride), alcohols, ethers, ketones, esters (for example, methyl formate), carbon dioxide, and water. Among these foaming agents, alkyl chloride having from 1 to 3 carbon atoms, aliphatic alcohol having 1 to 4 carbon atoms, ethers having from 1 to 3 carbon atoms in the alkyl chain, carbon dioxide, and water are preferable. Examples of the alkyl chloride having from 1 to 3 carbon atoms include methyl chloride and ethyl chloride. Examples of fatty alcohols having 1 to 4 carbon atoms include methanol, ethanol, propyl alcohol, isopropyl alcohol, butyl alcohol, sec-butyl alcohol, tert-butyl alcohol, allyl alcohol, crotyl alcohol, and propagyl alcohol. Examples of ethers having 1 to 3 carbon atoms in the alkyl chain include dimethyl ether, ethyl methyl ether, diethyl ether, and methylene dimethyl ether. In particular, methyl chloride, dimethyl ether, methanol, ethanol, carbon dioxide, and water are preferable, and carbon dioxide and water are more preferable. Since carbon dioxide has the effect of reducing the bubbles in the obtained extruded heat insulating foam heat insulating plate, it can be expected to reduce the addition of a bubble adjusting agent and improve the heat insulating performance. On the other hand, since water is excellent in kneadability with the base resin, it can be expected to obtain an extruded foamed heat insulating plate having a higher foaming ratio.

The amount of the above-mentioned foaming agent added is appropriately selected in relation to the desired foaming ratio, but is preferably from 0.4 to 3 mol/kg, and more preferably from 0.6 to 2.5 mol/kg as a mixed foaming agent with respect to the base resin of the resin foam. The above resin foam may contain a flame retardant, and the flame retardant is preferably a bromine-based flame retardant. Examples of the bromine-based flame retardant include tetrabromobisphenol A, tetrabromobisphenol A-bis(2,3-dibromopropyl ether), tetrabromobisphenol A-bis(2,3-dibromo-2-methylpropyl ether), tetrabromobisphenol A-bis(2-bromoethyl ether), tetrabromobisphenol A-bis(allyl ether), 2,2-bis[4-(2,3-dibromo-2-methylpropoxy)-3,5-dibromophenyl]propane, tetrabromobisphenol S, tetrabromobisphenol S-bis(2,3-dibromopropyl ether), hexabromocyclododecane, tetrabromocyclooctane, tris(2,3-dibromopropyl) isocyanurate, tribromophenol, decabromodiphenyloxide, tris(tribromoneopentyl)phosphate, N-2,3-dibromopropyl-4,5-dibromohexahydrophthalimide, brominated polystyrene, brominated bisphenol ether derivative, and brominated styrene-butadiene-styrene block copolymer (brominated SBS).

These compounds can be used alone or in admixture of two or more. Among the above bromine-based flame retardants, from the viewpoint of high thermal stability and high flame retardant effect, hexabromocyclododecane, tetrabromocyclooctane, tetrabromobisphenol A-bis(2,3-dibromopropyl ether), 2,2-bis[4-(2,3-dibromo-2-methylpropoxy)-3,5-dibromophenyl]propane, and tris(2,3-dibromopropyl) isocyanurate are particularly preferable.

In the foam, a flame retardant auxiliary may be in combination with the bromine-based flame retardant. Examples of flame retardant auxiliary include diphenyl alkanes or diphenyl alkenes such as 2,3-dimethyl-2,3-diphenylbutane, 2,3-diethyl-2,3-diphenylbutane, 3,4-dimethyl-3,4-diphenylhexane, 3,4-diethyl-3,4-diphenyl hexane, 2,4-diphenyl-4-methyl-1-pentene, and 2,4-diphenyl-4-ethyl-1-pentene; polyalkylated aromatic compounds such as poly-1,4-diisopropylbenzene; nitrogen-containing cyclic compounds such as cyanuric acid, isocyanuric acid, trially isocyanurate, melamine cyanurate, melamine, melam, and melem; silicone compounds; inorganic compounds such as antimony trioxide, diantimony pentoxide, zinc tinate, boron oxide, zinc borate, zinc sulfide, and ammonium sulfate; and phosphorus compounds such as triphenyl phosphate, cresildi-2,6-xylenyl phosphate, red phosphorus-based compounds, ammonium polyphosphate, phosphazene, and hypophosphate. These flame retardant auxiliarys may be used alone or in admixture of two or more.

The content of the above flame retardant is preferably 1 part by mass or more, more preferably 1.5 parts by mass or more, and even more preferably 2 parts by mass or more with respect to 100 parts by mass of the resin foam excluding the flame retardant and the flame retardant auxiliary. By setting the content in such a range, it is possible to further improve the flame retardancy. The upper limit of the content of the flame retardant is preferably 10 parts by mass or less, more preferably 7 parts by mass or less, still more preferably 5 parts by mass or less, with respect to 100 parts by mass of the resin foam excluding the flame retardant and the flame retardant auxiliary. By setting the upper limit to such a range, the mechanical strength of the resin foam is excellent.

The content of the above flame retardant auxiliary is, in the case of diphenylalkane or diphenylalkene, preferably from 0.05 to 1 part by mass, more preferably from 0.1 to 0.5 part by mass with respect to 100 parts by mass of the resin foam excluding the flame retardant and the flame retardant auxiliary, and in the case of the other flame retardant auxiliarys, the content is preferably from 0.5 to 5 parts by mass, and more preferably from 1 to 4 parts by mass with respect to 100 parts by mass of the resin foam excluding the flame retardant and the flame retardant auxiliary.

The above resin foam may contain a heat insulating property improver. Examples of the heat insulating property improver include metal oxides such as titanium oxide, metals such as aluminum, fine powders such as ceramics, carbon black, and graphite, infrared shielding pigments, and hydrotalcites. These can be used alone or in combination of two or more. The content of the heat insulating property improver is preferably from 0.5 to 5 parts by mass, and more preferably from 1 to 4 parts by mass with respect to 100 parts by mass of the base resin of the foam. By setting the content in such a range, a resin foam having excellent heat insulating properties and mechanical strength can be obtained.

If necessary, the above resin foam can be appropriately blended with various additives other than those described above, such as bubble modifiers, colorants such as pigments and dyes other than infrared shielding pigments, and heat stabilizers. Examples of the bubble modifier include inorganic powders such as talc, kaolin, mica, silica, calcium carbonate, barium sulfate, clay, bentonite, diatomaceous earth, and known chemical foaming agents such as azodicarbondiamide. Of these, talc is preferable because it does not hinder flame retardancy and the bubble diameter can be easily adjusted.

For details of the resin foam multilayer body, in addition to the above, the description of JP 58-162337 A, JP 2002-144497 A, and JP 2013-82805 A can be taken into consideration without departing from the spirit of the present invention, and these contents can be incorporated herein by reference.

For the gas barrier property of the resin form multilayer body, it is desirable to evaluate the gas barrier property of the resin form multilayer body itself. As such a method, a method of laminating a barrier resin layer on a resin foam of a polystyrene resin and evaluating the gas barrier property of the obtained resin foam multilayer body can be considered. However, in the above evaluation method, since the resin foam layer of the resin foam multilayer body has a large thickness and low gas barrier property, and the influence of gas transmission in the thickness direction is large, it is difficult to evaluate the gas barrier property in the plane direction, which is important for suppressing the increase in thermal conductivity. Therefore, the gas barrier property can be evaluated by laminating a film to be laminated as a resin foam multilayer body on a polystyrene film and using the obtained polystyrene film multilayer body as a pseudo resin form multilayer body.

The thermal conductivity of the obtained resin foam multilayer body can be measured based on the flat plate heat flow meter method described in JIS A 1412-2 (1999) (two heat flow meters, high temperature side 38° C., low temperature side 8° C., average temperature 23° C.).

EXAMPLES

The present invention will be described in more detail below through examples. The following materials, usage amounts, proportions, processing details, processing procedures, and the like described in the examples may be changed, as appropriate, as long as there is no deviation from the spirit of the present invention. Therefore, the scope of the present invention is not limited to the specific examples described below.

The glass transition temperature and melting point in the present specification are measured according to the description in paragraph of WO 2017/134946. Further, the crystal melting enthalpy ΔHm is measured from a value in the temperature raising process according to JIS K7121 and K7122.

Raw Material
<Barrier Resin>
MXD6: polymetaxylylene adipamide
<<Synthesis of MXD6>>

A 50 L jacketed reactor equipped with a stirrer, a partial condenser, a cooler, a thermometer, a dropping tank, and a nitrogen gas introduction tube was charged with 15 kg of adipic acid, 0.4 g of sodium hypophosphate monohydrate, and 0.2 g of sodium acetate, and then sufficiently purged with nitrogen, and heated to 180° C. under a small amount of nitrogen stream to uniformly melt adipic acid, after which 13.9 kg of m-xylylenediamine was added dropwise over 110 minutes under stirring the system. During this time, the internal temperature was continuously increased to 245° C. Note that the water produced by polycondensation was removed from the system through the partial condenser and the cooler. After the completion of dropwise addition of the m-xylylenediamine, the internal temperature was further increased to 260° C., and the reaction was continued for 1 hour, after which a polymer was removed as a strand from a nozzle at the bottom of the reactor, and cooled with water and then pelletized to obtain a pelletized polymer.

Next, the polymer obtained through the above operation was inserted into a 250 L rotary tumbler equipped with a heating jacket, a nitrogen gas introduction tube, and a vacuum line, and the pressure in the system was reduced while rotating the tumbler, after which the pressure was returned to normal pressure using nitrogen of a purity of 99 vol % or more. This operation was performed three times. Subsequently, the temperature inside the system was increased to 140° C. under nitrogen circulation. Next, the pressure inside the system was reduced, the temperature in the system was continuously increased to 200° C. and held for 30 minutes at 200° C., after which nitrogen was introduced to return the system to normal pressure, and then the reaction system was cooled to obtain a polyamide resin (MXD6).

The melting point of the obtained polyamide resin was 237° C., the number average molecular weight was 26000, and the glass transition temperature was 85° C.

MXD6I (6):

Polyamide resin composed of m-xylylenediamine, adipic acid, and isophthalic acid, and having a molar ratio of adipic acid to isophthalic acid of 94:6.

<<Synthesis of MXD6I (6)>>

A polyamide resin (MXD6I (6)) was obtained by synthesis in the same manner as "Synthesis of MXD6" except that a 50 L reactor was charged with 15.1 kg of adipic acid, 1.1 kg of isophthalic acid, 14.9 kg of m-xylylenediamine, 13.9 g of sodium hypophosphate monohydrate, and 7.2 g of sodium acetate.

The melting point of the obtained polyamide resin was 229° C., the number average molecular weight was 26000, and the glass transition temperature was 92° C.

MXD6I (50):

Polyamide resin composed of m-xylylenediamine, adipic acid, and isophthalic acid, and having a molar ratio of adipic acid to isophthalic acid of 50:50.

<<Synthesis of MXD6I (50)>>

A 50 L jacketed reactor equipped with a stirrer, a partial condenser, a cooler, a thermometer, a dripping tank, and a nitrogen gas introduction tube was charged with 7.5 kg of adipic acid, 8.5 kg of isophthalic acid, 9.3 g of sodium hypophosphite monohydrate, and 4.8 g of sodium acetate, and then sufficiently purged with nitrogen and heated to 180° C. under a small nitrogen stream to uniformly melt adipic acid and isophthalic acid, after which 13.9 kg of metaxylylenediamine was added dropwise over 170 minutes under stirring the system. During this time, the internal temperature was continuously increased to 265° C. Note that the water produced by polycondensation was removed from the system through the partial condenser and the cooler. After the completion of dropwise addition of m-xylylenediamine, the internal temperature was further increased to 270° C., and the reaction was continued for 10 minutes, after which a polymer was removed as a strand from a nozzle at the bottom of the reactor, and cooled with water and then pelletized to obtain a pelletized polymer.

Next, the polymer obtained through the above operation was inserted into a 250 L rotary tumbler equipped with a heating jacket, a nitrogen gas introduction tube, and a vacuum line, and the pressure in the system was reduced while rotating the tumbler, after which the pressure was returned to normal pressure using nitrogen of a purity of 99 vol % or more. This operation was performed three times. Subsequently, the temperature inside the system was increased to 115° C. under nitrogen circulation. Next, the pressure inside the system was reduced, the temperature was maintained at 115° C. for 24 hours, nitrogen was introduced to return the system to normal pressure, and then the mixture was cooled to obtain a polyamide resin (MXD6I (50)).

It was found that the polyamide resin (MXD6I (50)) had a crystal melting enthalpy ΔHm of substantially 0 J/g in the temperature raising process, and was amorphous. The number average molecular weight was 13500. The Tg was 127° C.

PA6:

Polyamide 6, 1022B, available from Ube Industries, Ltd.

EVOH:

Ethylene-vinyl alcohol copolymer, E171B, available from Kuraray Co., Ltd.

PET:

1.5 mol % isophthalic acid copolymer polyethylene terephthalate, BK2180, available from Mitsubishi Chemical Corporation G21: Polyamide 6I/6T, available from Ems-Chemie (Japan) Co., Ltd., Grivory G21, oxygen transmission coefficient: 0.5 cc·mm/m$^2$·day·atm.

<Other Resin>

PP resin: Novatec FY6 (available from Japan Polypropylene Corporation)

Adhesive resin: Admer QB515 (available from Mitsui Chemicals, Inc.)

<Filler (Plate-Shaped Talc or its Substitute)>

PAOG-2: plate-shaped talc, available from Nippon Talc Co., Ltd., high aspect ratio talc series, aspect ratio 45, particle size (median diameter $D_{50}$) 7 μm, specific surface area 8.5 m$^2$/g PAOG-3: plate-shaped talc, available from Nippon Talc Co., Ltd., product number: High aspect ratio talc series PAOG-3, aspect ratio 40, particle size (median diameter D50) 5 μm, specific surface area 11 m$^2$/g P-2: Plate-shaped talc, available from Nippon Talc Co., Ltd., product number: Micro Ace series P-2, aspect ratio 20, particle size (median diameter $D_{50}$) 7 μm, specific surface area 7.5 m$^2$/g PAOG-2 surface treatment: PAOG-2 was surface-treated with Z-6020 (3-(2-aminoethyl)aminopropyltrimethoxysilane, available from Toray Dow Corning Co., Ltd.). The content of the surface treatment agent was 10 mass % of the PAOG-2 surface treatment.

HT7000: granular talc, aspect ratio 10, available from Harima Chemicals, Inc.

<Production Method of Filler-Blended Product of MXD6>

A twin-screw extruder (available from Toshiba Machine Co., Ltd., TEM37BS) was used, of which the temperature was set to 260° C. The MXD6 pellets and PAOG-2 powder were supplied from the first chute of the twin-screw extruder and melt-kneaded to obtain pellets. The MXD6 pellets and PAOG-2 powder were filled in different hoppers and supplied from a feeder so as to have the compositions shown in Tables 1 to 3. The obtained pellets were vacuum dried at 150° C. for 5 hours to obtain a filler-blended product of MXD6.

<Production Method of Filler-Blended Product of MXD6I>

A filler-blended product of MXD6I was produced in the same manner as the filler-blended product of MXD6.

<Production Method of Filler-Blended Product of PA6>

A filler-blended product of PA6 was produced in the same manner as the filler-blended product of MXD6.

<Production Method of Filler-Blended Product of EVOH>

An filler-blended product of EVOH was produced in the same manner as the filler-blended product of MXD6 except that the temperature of the twin-screw extruder was 220° C.

<Production Method of Filler-Blended Product of PET>

A filler-blended product of PET was produced in the same manner as the filler-blended product of MXD6 except that the temperature of the twin-screw extruder was 280° C.

<Preparation of Filler-Blended Product of Example 5>

<<Preparation of PAOG-2 Masterbatch>>

A twin-screw extruder (TEM37BS, available from Toshiba Machine Co., Ltd.) was used, of which the temperature was set to 260° C. 100 parts by mass of MXD6 pellets were supplied from the hopper, and 100 parts by mass of PAOG-2 powder was supplied from the middle of the extruder, and they were kneaded and extruded into pellets. The obtained pellets were vacuum dried at 150° C. for 5 hours to obtain pellets of a polyamide resin composition in which PAOG-2 was 50 mass % in a masterbatch of MXD6 containing PAOG-2.

<<Preparation of PAOG-2 Dilution>>

100 parts by mass of pellets of the above PAOG-2 masterbatch and 150 parts by mass of pellets of MXD6 were collectively mixed using a V-type blender.

Films (Examples 1 to 14, Comparative Example 1, Reference Examples 1 to 7)

<Formation of Film Using MXD6 and Filler-Blended Product of MXD6>

A twin-screw extruder with a T-die (PTM-30, available from Plastic Engineering Laboratory) and a cooling roll were used, the temperature of the twin-screw extruder was set to 260° C., and the first cooling roll temperature was set to 80° C. A resin composition containing a thermoplastic resin and a filler (plate-shaped talc or a substitute thereof) was supplied to a twin-screw extruder from the first chute so as to have the compositions shown in Tables 1 to 3, and was melt-extruded from a T-die to obtain a film having a thickness of 50 μm and a width of 130 mm (non-stretched film).

Various characteristics of the obtained film were evaluated as follows. The results are shown in Tables 1 to 3 below.

<Formation of Film Using PA6 and Filler-Blended Product of PA6>

Film formation was performed in the same manner as the filler-blended product of MXD6 except that the first cooling roll temperature was 60° C., and a film having a thickness of 50 μm and a width of 130 mm (non-stretched film) was obtained.

<Formation of Film Using EVOH and Filler-Blended Product of EVOH>

Film formation was performed in the same manner as the filler-blended product of MXD6 except that the temperature of the twin-screw extruder was 220° C. and the first cooling roll temperature was 70° C., and a film having a thickness of 50 μm and a width of 130 mm (non-stretched film) was obtained.

<Formation of Film Using PET and Filler-Blended Product of PET>

Film formation was performed in the same manner as the filler-blended product of MXD6 except that the temperature of the twin-screw extruder was 280° C., and a film having a thickness of 50 μm and a width of 130 mm (unstretched film) was obtained.

<Maximum Length to Minimum Width Ratio $R^{max}$ of Plate-Shaped Talc>

The maximum length to minimum width ratio $R^{max}$ of the plate-shaped talc in the film (molded body) obtained above was determined as follows.

That is, the largest value among $R^0$, $R^{45}$, and $R^{90}$ was measured as $R^{max}$.

<<Measurement of $R^0$, $R^{45}$, and $R^{90}$>>

After laminating aluminum foil on the molded body with Aron Alpha, the molded body was cut perpendicular to the film surface, and the cross section was cut by ion milling (this cross section is called cross section A). The cutting direction here was designated as 0°. During ion milling, the molded body was irradiated with argon ion beam from the aluminum foil.

Conditions for ion milling of cross section
Instrument: IM-4000, available from Hitachi, Ltd.
Condition: Acceleration voltage 4 kV
Discharge voltage 1.5 kV
Mode C4
Processing time 4 hours
Projection amount 30 μm The obtained sample was subjected to conductive treatment with tungsten for 60 seconds, and then the reflected electron image of the cross section A obtained by scanning electron microscope was observed (SEM observation). For each of the plate-shaped talc existing in the region of 30 μm in length×40 μm in width (area of 1200 μm²), two parallel tangents were drawn at both ends of the longest part, and the distance between the tangents was defined as the maximum length L. Next, a line across each particle and parallel to the two tangents was drawn, the length of the longest line segment in the portion overlapping the particle was measured, and the length was defined as the minimum width d. The maximum length to minimum width ratio (L/d) was measured for each particle. The same operation was repeated twice, and in the obtained distribution of the maximum length to minimum width ratio (L/d), the average value of the top (largest value) 1% of the maximum length to minimum width ratios (L/d) was set to $R^0$.

Next, for the cross section perpendicular to the film surface of the molded body and in a direction of 45° with respect to the cross section A, the average value ($R^{45}$) of the top 1% of the maximum length to minimum width ratios of the plate-shaped talcs contained in a region of 1200 μm² was determined in the same manner as described above.

Further, for the cross section perpendicular to the film surface of the molded body and in a direction of 90° with respect to the cross section A, the average value ($R^{90}$) of the top 1% of the maximum length to minimum width ratios of the plate-shaped talcs contained in a region of 1200 μm² was determined in the same manner as described above.

In the observed cross section where the largest value among $R^0$, $R^{45}$, and $R^{90}$ was obtained, the proportion X (unit: %) of the number of particles having an R of more than 9 with respect to the number of all particles was determined.

(Proportion X of the number of plate-shaped talc particles with a maximum length to minimum width ratio R of more than 9)[%]=(Number of plate-shaped talc particles with a maximum length to minimum width ratio R of more than 9)/(Number of all plate-shaped talc particles)×100

The conditions for SEM observation are as follows.
Instrument: SU8020 available from Hitachi, Ltd.
Condition: Acceleration voltage 1 kV
Probe current 20 μA, Normal Observation magnification 3000 times
Operation distance 3 mm
No slope
Conductive treatment with tungsten for 60 seconds
<Oxygen Transmission Coefficient (OTC)>

For the films obtained above, the oxygen transmission rate (OTR) in an atmosphere of relative humidity (60% RH, 80% RH, 90% RH) shown in Tables 1 to 3 was measured at 23° C. using an oxygen transmission coefficient measuring device, according to ASTM D3985. The unit pressure of OTR and OTC was 1 atm, and the unit transmission time was 24 hours. Note that the oxygen transmission coefficient (OTC) is calculated as follows.

OTC=OTR×measured film thickness/1000

OTR unit cc·mm/(m²·day· atm)
OTC unit cc·mm/(m²·day· atm)
Unit of measured film thickness μm The oxygen transmission rate (OTR) was measured using an oxygen transmission rate measuring device (product name: "OX-TRAN (trade name) 2/21", available from MOCON Inc.).

Note that 60% RH indicates an atmosphere at a relative humidity of 60% (the same applies to 80% RH and others).

The barrier improvement coefficient is a ratio ($OTC^{90'}/OTC^{90}$) of oxygen transmission coefficient $OTC^{90}$ of the resin composition at a relative humidity of 90% and a temperature of 23° C. to the oxygen transmission coefficient $OTC^{90'}$ of a composition (Reference Examples 1 to 7, barrier resin only) obtained by removing plate-shaped talc from the resin composition measured according to ASTM D3985 at a relative humidity of 90% and a temperature of 23° C. The same applies to the cases of relative humidities of 60% and 80%.

The barrier deterioration coefficient is a ratio ($OTC^{80}/OTC^{60}$, $OTC^{90}/OTC^{60}$) of oxygen transmission coefficient $OTC^{60}$ of the resin composition at a relative humidity of 60% and a temperature of 23° C. to the oxygen transmission coefficient $OTC^{80}$ or $OTC^{90}$ of the resin composition measured according to ASTM D3985 at a relative humidity of 80% or 90% and a temperature of 23° C.

Tensile Test (Tensile Modulus of Elasticity, Tensile Strength at Break, Tensile Elongation at Break)

The film obtained above was stored for 1 week in an environment of 23° C. and a relative humidity of 50%, and then measured at a test speed of 50 mm/min using a strip having a width of 10 mm according to JIS K 7127. In the measurement, a tensile test was performed in the machine direction (MD) of the film. The distance between the chucks was set to 50 mm.

TABLE 1

| | | | Reference Example 1 | Example 1 | Example 2 | Example 3 | Example 4 | Example 5 |
|---|---|---|---|---|---|---|---|---|
| | Type of barrier resin | | MXD6 | MXD6 | MXD6 | MXD6 | MXD6 | MXD6 |
| Plate-shaped talc | Type | | | PAOG-2 | PAOG-2 | PAOG-2 | PAOG-2 | PAOG-2 Dilution |
| | Raw material aspect ratio | | | 45 | 45 | 45 | 45 | 45 |
| | Particle size (D = 50) | μm | | 7 | 7 | 7 | 7 | 7 |
| | Added amount | mass % | 0 | 10 | 20 | 30 | 50 | 20 |
| Unstretched film | Thickness | μm | 50 | 50 | 50 | 50 | 50 | 50 |
| | Maximum length to minimum width ratio $R^{max}$ of plate-shaped talc | $R^0$ | | 14.8 | 14.4 | 14.0 | 13.4 | 13.6 |
| | | $R^{45}$ | | 14.1 | 13.7 | 13.3 | 12.7 | 12.9 |
| | | $R^{90}$ | | 13.3 | 13.0 | 12.6 | 12.1 | 12.2 |
| | | $R^{max}$ | | 14.8 | 14.4 | 14.0 | 13.4 | 13.6 |
| | Proportion X of number of plate-shaped talc particles with R greater than 9 | % | | 7.9 | 7.8 | 7.8 | 7.7 | 7.7 |
| OTC (23° C.) | | | | | | | | |
| 60% RH | | cc·mm/m²·day·atm | 0.091 | 0.054 | 0.042 | 0.026 | 0.014 | 0.043 |
| 80% RH | | cc·mm/m²·day·atm | 0.100 | 0.059 | 0.043 | 0.028 | 0.016 | 0.044 |
| 90% RH | | cc·mm/m²·day·atm | 0.190 | 0.109 | 0.079 | 0.050 | 0.031 | 0.080 |
| Barrier improvement coefficient (vs barrier resin) | | | | | | | | |
| 60% RH | | Fold | 1.0 | 1.7 | 2.2 | 3.5 | 6.5 | 2.1 |
| 80% RH | | Fold | 1.0 | 1.7 | 2.3 | 3.6 | 6.3 | 2.3 |
| 90% RH | | Fold | 1.0 | 1.7 | 2.4 | 3.8 | 6.1 | 2.4 |
| Barrier deterioration coefficient (vs 60% RH) | | | | | | | | |
| 80% RH | | Fold | 1.1 | 1.1 | 1.0 | 1.1 | 1.1 | 1.0 |
| 90% RH | | Fold | 2.1 | 2.0 | 1.9 | 1.9 | 2.2 | 1.9 |
| Tensile test | | | | | | | | |
| MD modulus of elasticity (GPa) | | | 3.0 | 3.8 | 4.3 | 5.0 | 7.3 | 5.0 |
| MD tensile strength (MPa) | | | 91 | 86 | 82 | 75 | 71 | 82 |
| MD elongation at break (%) | | | 4 | 3 | 3 | 2 | 1 | 3 |

TABLE 1-continued

|  |  |  | Example 6 | Example 7 | Example 8 | Comparative Example 1 |
|---|---|---|---|---|---|---|
|  | Type of barrier resin |  | MXD6 | MXD6 | MXD6 | MXD6 |
| Plate-shaped talc | Type |  | PAOG-3 | PAOG-2 Surface treatment | P-2 | HT7000 |
|  | Raw material aspect ratio |  | 40 | 45 | 20 | 10 |
|  | Particle size (D = 50) | μm | 5 | 7 | 7 | — |
|  | Added amount | mass % | 30 | 27 | 30 | 10 |
| Unstretched film | Thickness | μm | 50 | 50 | 50 | 50 |
|  | Maximum length to | $R^0$ | 14.0 | 14.0 | 10.5 | 8.0 |
|  | minimum width ratio $R^{max}$ | $R^{45}$ | 13.3 | 13.3 | 10.0 | 7.6 |
|  | of plate-shaped talc | $R^{90}$ | 12.6 | 12.6 | 9.5 | 7.2 |
|  |  | $R^{max}$ | 14.0 | 14.0 | 10.5 | 8.0 |
|  | Proportion X of number of plate-shaped talc particles with R greater than 9 | % | 7.6 | 7.7 | 3.7 | 0.2 |
|  | OTC (23° C.) |  |  |  |  |  |
|  | 60% RH | cc · mm/m² · day · atm | 0.025 | 0.028 | 0.029 | 0.070 |
|  | 80% RH | cc · mm/m² · day · atm | 0.027 | 0.030 | 0.033 | 0.071 |
|  | 90% RH | cc · mm/m² · day · atm | 0.048 | 0.054 | 0.061 | 0.136 |
|  | Barrier improvement coefficient (vs barrier resin) |  |  |  |  |  |
|  | 60% RH | Fold | 3.6 | 3.3 | 3.1 | 1.3 |
|  | 80% RH | Fold | 3.7 | 3.3 | 3.0 | 1.4 |
|  | 90% RH | Fold | 4.0 | 3.5 | 3.1 | 1.4 |
|  | Barrier deterioration coefficient (vs 60% RH) |  |  |  |  |  |
|  | 80% RH | Fold | 1.1 | 1.1 | 1.1 | 1.0 |
|  | 90% RH | Fold | 1.9 | 1.9 | 2.1 | 1.9 |
|  | Tensile test |  |  |  |  |  |
|  | MD modulus of elasticity (GPa) |  | 5.5 | 4.8 | 4.4 | 4.4 |
|  | MD tensile strength (MPa) |  | 86 | 72 | 84 | 84 |
|  | MD elongation at break (%) |  | 3 | 2 | 2 | 2 |

TABLE 2

|  |  |  | Reference Example 2 | Example 9 | Reference Example 3 | Example 10 | Reference Example 4 | Example 11 |
|---|---|---|---|---|---|---|---|---|
|  | Type of barrier resin |  | MXD6I (6) | MXD6I (6) | MXD6I (50) | MXD6I (50) | PA6 1022B | PA6 1022B |
| Plate-shaped talc | Type |  |  | PAOG-2 |  | PAOG-2 |  | PAOG-2 |
|  | Raw material aspect ratio |  |  | 45 |  | 45 |  | 45 |
|  | Particle size (D = 50) | μm |  | 7 |  | 7 |  | 7 |
|  | Added amount | mass % | 0 | 30 | 0 | 30 | 0 | 20 |
| Unstretched film | Thickness | μm | 50 | 50 | 50 | 50 | 50 | 50 |
|  | Maximum length to | $R^0$ |  | 14.1 |  | 14.2 |  | 14.1 |
|  | minimum width ratio $R^{max}$ | $R^{45}$ |  | 13.4 |  | 13.5 |  | 13.4 |
|  | of plate-shaped talc | $R^{90}$ |  | 12.7 |  | 12.8 |  | 12.7 |
|  |  | $R^{max}$ |  | 14.1 |  | 14.2 |  | 14.1 |
|  | Proportion X of number of plate-shaped talc particles with R more than 9 | % |  | 7.8 |  | 7.8 |  | 7.8 |
|  | OTC (23° C.) |  |  |  |  |  |  |  |
|  | 60% RH | cc · mm/m² · day · atm | 0.067 | 0.019 | 0.080 | 0.026 | 0.929 | 0.470 |
|  | 80% RH | cc · mm/m² · day · atm | 0.074 | 0.025 | 0.085 | 0.027 | 1.532 | 0.810 |
|  | 90% RH | cc · mm/m² · day · atm | 0.141 | 0.045 | 0.092 | 0.032 | 2.472 | 1.334 |
|  | Barrier improvement coefficient (vs barrier resin) |  |  |  |  |  |  |  |
|  | 60% RH | Fold | 1.0 | 3.5 | 1.0 | 3.1 | 1.0 | 2.0 |
|  | 80% RH | Fold | 1.0 | 3.0 | 1.0 | 3.1 | 1.0 | 1.9 |
|  | 90% RH | Fold | 1.0 | 3.1 | 1.0 | 2.9 | 1.0 | 1.9 |

TABLE 2-continued

|  |  |  | Reference Example 2 | Example 9 | Reference Example 3 | Example 10 | Reference Example 4 | Example 11 |
|---|---|---|---|---|---|---|---|---|
| Barrier deterioration coefficient (vs 60% RH) | | | | | | | | |
| 80% RH | Fold | | 1.1 | 1.3 | 1.1 | 1.0 | 1.6 | 1.7 |
| 90% RH | Fold | | 2.1 | 2.4 | 1.2 | 1.2 | 2.7 | 2.8 |
| Tensile test | | | | | | | | |
| MD modulus of elasticity (GPa) | | | 3.0 | 5.0 | 3.4 | 5.6 | 0.8 | 1.6 |
| MD tensile strength (MPa) | | | 93 | 78 | 109 | 97 | 74 | 85 |
| MD elongation at break (%) | | | 4 | 2 | 4 | 65 | 521 | 537 |

TABLE 3

|  |  |  | Reference Example 5 | Example 12 | Reference Example 6 | Example 13 | Reference Example 7 | Example 14 |
|---|---|---|---|---|---|---|---|---|
|  | Type of barrier resin |  | EVOH E171B | EVOH E171B | EVOH F171B | EVOH F171B | PET BK2180 | PET BK2180 |
| Plate-shaped talc | Type |  |  | PAOG-2 |  | PAOG-2 |  | PAOG-2 |
|  | Raw material aspect ratio |  |  | 45 |  | 45 |  | 45 |
|  | Particle size (D = 50) | μm |  | 7 |  | 7 |  | 7 |
|  | Added amount | mass % | 0 | 20 | 0 | 20 | 0 | 20 |
| Unstretched film | Thickness | μm | 50 | 50 | 50 | 50 | 50 | 50 |
|  | Maximum length to | $R^0$ |  | 14.3 |  | 14.3 |  | 14.2 |
|  | minimum width ratio $R^{max}$ | $R^{45}$ |  | 13.6 |  | 13.6 |  | 13.5 |
|  | of plate-shaped talc | $R^{90}$ |  | 12.9 |  | 12.9 |  | 12.8 |
|  |  | $R^{max}$ |  | 14.3 |  | 14.3 |  | 14.2 |
|  | Proportion X of number of plate-shaped talc particles with R more than 9 | % |  | 7.8 |  | 7.8 |  | 7.8 |
| OTC (23° C.) | | | | | | | | |
| 60% RH | | cc · mm/m² · day · atm | 0.056 | 0.029 | 0.007 | 0.004 | 3.274 | 1.637 |
| 80% RH | | cc · mm/m² · day · atm | 0.120 | 0.060 | 0.039 | 0.020 | 3.151 | 1.576 |
| 90% RH | | cc · mm/m² · day · atm | 0.244 | 0.123 | 0.346 | 0.173 | 2.973 | 1.487 |
| Barrier improvement coefficient (vs barrier resin) | | | | | | | | |
| 60% RH | Fold | | 1.0 | 1.9 | 1.0 | 1.8 | 1.0 | 2.0 |
| 80% RH | Fold | | 1.0 | 2.0 | 1.0 | 2.0 | 1.0 | 2.0 |
| 90% RH | Fold | | 1.0 | 2.0 | 1.0 | 2.0 | 1.0 | 2.0 |
| Barrier deterioration coefficient (vs 60% RH) | | | | | | | | |
| 80% RH | Fold | | 2.1 | 2.1 | 5.6 | 5.0 | 1.0 | 1.0 |
| 90% RH | Fold | | 4.4 | 4.2 | 49.4 | 43.3 | 0.9 | 0.9 |
| Tensile test | | | | | | | | |
| MD modulus of elasticity (GPa) | | | 2.1 | 2.8 | 2.5 | 2.7 | 2.0 | 3.5 |
| MD tensile strength (MPa) | | | 67 | 61 | 66 | 68 | 58 | 63 |
| MD elongation at break (%) | | | 360 | 340 | 291 | 257 | 4 | 4 |

As is clear from the above results, when the plate-shaped talc contained in the film formed from the resin composition of the present invention satisfies a specific maximum length to minimum width $R^{max}$, the film had excellent barrier property under high humidity. It was also excellent in tensile properties (comparison between Examples 1 to 14 and Reference Examples 1 to 7 and Comparative Example 1).

Multilayer Cup (Examples 20 to 24, Reference Examples 20 and 21)

<Production of Cup>

A multilayer extrusion apparatus equipped with three extruders, a feed block and a T-die was used. The barrier resin and the plate-shaped talc were blended in a composition shown in Table 4 and the resin composition was extruded at 250° C. from the first extruder. In addition, polypropylene (available from Japan Polypropylene Corporation, product name: Novatec, grade: FY6) was extruded from the second extruder at 230° C., and an adhesive resin (available from Mitsui Chemicals, Inc., product name: Admer, grade: QB515) was extruded from the third extruder at 220° C. The molten resins extruded from the first to third extruders were supplied to the feed block, extruded from the T-die onto a cooling roll at 30° C., and wound up. The multilayer sheet obtained here has a three-type five-layer structure in the order of a polypropylene layer/an adhesive resin layer/a barrier resin layer/an adhesive resin layer/a polypropylene layer from the outer layer. The thickness of each layer was 440/10/100/10/440 (μm).

Next, using a compressed air vacuum forming machine (available from Asano Laboratories Co., Ltd.) equipped with plug assist, compressed air vacuum forming was performed when the sheet surface temperature reached 200° C., thereby preparing a multilayer container having an opening of 79 mm square, a bottom of 63 mm, a depth of 25 mm, a surface area of 110 cm², and a volume of 100 mL.

<Oxygen Transmission Rate of Cup>

The oxygen transmission rate of the multilayer containers prepared in Examples 20 to 24 and Reference Examples 20 and 21 was evaluated as follows.

The oxygen transmission rate of the multilayer container was measured using an oxygen transmission rate measuring device according to ASTM D3985. The multilayer container was filled with 20 mL of distilled water through the opening thereof, and the opening was sealed by heat welding with an aluminum foil laminated film. Two holes were made in the aluminum foil laminated film, a copper tube was inserted, and the film was hardened with epoxy resin. Thereafter, the film was connected to an oxygen transmission rate measuring device and measured in an atmosphere of 23° C., an internal relative humidity of 100%, and an external relative humidity of 50%.

The oxygen transmission rate (OTR) was measured using an oxygen transmission rate measuring device (product name: "OX-TRAN (trade name) 2/21", available from MOCON Inc.).

machine was used. Corona treatment was applied to one side of a paper base material with a basis weight of 400 g/m². Thereafter, low-density polyethylene (trade name: Novatec LD LC602A, available from Japan Polyethylene Corporation, hereinafter abbreviated as "LDPE") was extruded and laminated on the corona-treated surface to a thickness of 30 μm, and further, the other surface of the paper base material was also subjected to corona treatment to produce a multi-layer body having LDPE layer/paper base material structure.

A multi-layer extrusion apparatus equipped with three extruders, a feed block, and a T-die was used. A barrier resin and plate-shaped talc were blended in a composition shown in Table 5, and the resin composition was extruded from the first extruder at 250° C. In addition, LDPE was extruded from the second extruder at 220° C., and adhesive polyethylene (trade name: Modic L504, available from Mitsubishi Chemical Co., Ltd., hereinafter abbreviated as "adhesive PE") was extruded from the third extruder at 220° C., a multilayer molten state was formed by the feed block in the order of an LDPE layer/an adhesive PE layer/a barrier resin layer/an adhesive PE layer/an LDPE layer. This was co-extruded and laminated so that the LDPE layer was laminated on the corona surface of the paper base material on which LDPE was extruded and laminated in advance to obtain a multilayer body. The structure of the obtained

TABLE 4

|  |  |  | Reference Example 20 | Example 20 | Example 21 | Example 22 | Example 23 | Reference Example 21 | Example 24 |
|---|---|---|---|---|---|---|---|---|---|
| Raw Material | Barrier material thickness | % | 10 | 10 | 10 | 10 | 10 | 10 | 10 |
|  | Barrier material |  |  |  |  |  |  |  |  |
|  | Base resin |  | MXD6I (6) | MXD6I (6) | MXD6I (6) | MXD6I (6) | MXD6I (6) | MXD6I (50) | MXD6I (50) |
|  | Plate-shaped talc |  |  | PAOG-2 | PAOG-2 | PAOG-2 | PAOG-2 |  | PAOG-2 |
|  | Raw material aspect ratio |  |  | 45 | 45 | 45 | 45 |  | 45 |
|  | Added amount of filler | mass % | 0 | 10 | 20 | 30 | 50 | 0 | 30 |
| Cup | Oxygen transmission rate at 23° C., 100% RH/50% RH | cc/package · day · 0.21 atm | 0.0017 | 0.0011 | 0.0007 | 0.0005 | 0.0014 | 0.0012 | 0.0004 |
|  | Maximum length to maximum width ratio of plate-shaped filler | $R^0$ |  | 14.7 | 14.2 | 14.0 | 13.3 |  | 14.1 |
|  |  | $R^{45}$ |  | 14.2 | 13.6 | 13.1 | 12.6 |  | 13.5 |
|  |  | $R^{90}$ |  | 13.5 | 13.3 | 12.7 | 12.3 |  | 12.6 |
|  |  | $R^{max}$ |  | 14.7 | 14.2 | 14.0 | 13.3 |  | 14.1 |
|  | Proportion X of number of plate-shaped talc particles with R more than 9 | % |  | 7.9 | 7.8 | 7.8 | 7.7 |  | 7.8 |

As is clear from the above results, when the resin composition of the present invention is molded into a cup (when the plate-shaped talc contained in the barrier resin layer satisfies a specific maximum length to minimum width ratio $R^{max}$), a cup having a significantly improved oxygen barrier property under high humidity was obtained, as compared with the case where a resin composition containing no predetermined talc is used for the cup (when the plate-shaped talc contained in the barrier resin layer does not satisfy the specific maximum length to minimum width ratio $R^{max}$)(comparison between Examples 20 to 24 and Reference Examples 20 and 21).

Paper Laminates (Examples 30 to 33, Comparative Example 30, Reference Example 30)

An extrusion laminator consisting of an extruder, a T-die, a cooling roll, a corona treatment apparatus, and a haul-off multilayer body was as follows: an LDPE layer (30 μm)/an adhesive PE layer (10 μm)/a resin composition layer (20 μm)/adhesive PE layer (10 μm)/an LDPE layer (30 μm)/a paper base material/an LDPE layer (30 μm) from the inner side of the container.

Next, an anti-heat sealant was applied to the part around the opening, then ruled lines were drawn and punching were performed on the multilayer body using a punching die to obtain a blank plate, the end face of the blank plate was treated, and then the body was heat-welded to form a sleeve. The sleeve was processed into a Gabel top paper container having an internal capacity of 500 mL by a molding and filling machine.

Paper Laminate (Example 34, Reference Example 31)

A multilayer body was produced in the same manner as in Production 1 of the paper laminate, except that the structure of the obtained laminate was an LDPE layer (50 μm)/an adhesive PE layer (15 μm)/a resin composition layer (20 μm)/a paper substrate/an LDPE layer (30 μm) from the inner side of the container, and a Gabel top paper container having an internal volume of 500 mL was prepared. The evaluation results are shown in Table 5.

<Openability>

The paper containers prepared in Examples 30 to 34 and Reference Examples 30 and 31 were filled with 500 mL of orange juice as contents under heat sterilization by a hot filling method at about 80° C., sealed, and stored at 25° C. for one month. Thereafter, the opening of the Gabel top portion was opened, and the openability and the effect of oxidation deterioration suppression effect were subjected to sensory evaluation as follows.

The paper container that can be easily opened without delamination in the co-extruded part is designated as A, and otherwise, it is designated as B. The evaluation results are shown in Table 5.

<Oxidation Deterioration Suppression Effect>

The orange juice after opening was visually compared with the orange juice before filling, and the color change was evaluated as follows. It was indicated that A has the smallest color change and D has the most significant color change. The evaluation results are shown in Table 5.

A: No color change observed
B: Extremely slight color change observed
C: Slight color change observed
D: Minor color change observed invention (when the plate-shaped talc contained in the barrier resin layer satisfies a specific maximum length to minimum width ratio $R^{max}$), the openability was excellent and the oxidation deterioration of the contents was suppressed (Comparison between Examples 30 to 34 and Reference Examples 30 and 31 and Comparative Example 30).

Resin Foam Multilayer Body (Examples 40 to 44, Reference Examples 40 and 41)

<Production of Pseudo Resin Foam Multilayer Body>

A resin composition containing a barrier resin and plate-shaped talc was blended in a composition shown in Table 6 and melt-extruded from a die. Specifically, the resin composition obtained by melt-kneading the components was extruded into a film having a thickness of 30 μm and a width of 130 mm, and cut into 90 mm squares (unstretched film). The obtained film was laminated on a polystyrene film having a thickness of 100 μm with a hot melt adhesive to obtain a polystyrene film multilayer body as a pseudo resin foam multilayer body.

<Barrier Property Improvement Rate>

For the above polystyrene film multilayer body, the oxygen transmission rate (OTR) in an atmosphere of 23° C. and 60% RH was measured using an oxygen transmission coefficient measuring device according to the method described in <Oxygen Transmission Coefficient (OTC)> described above according to ASTM D3985. The barrier improvement coefficient is a ratio ($OTR^{60'}/OTR^{60}$) of the oxygen trans-

TABLE 5

| | | | Reference Example 30 | Example 30 | Example 31 | Example 32 | Comparative Example 30 | Example 33 | Reference Example 31 | Example 34 |
|---|---|---|---|---|---|---|---|---|---|---|
| Raw Material | Barrier material thickness μm | | 20 | 20 | 20 | 20 | 20 | 20 | 20 | 20 |
| | Layer structure of paper container | | 7 layers | 7 layers | 7 layers | 7 layers | 7 layers | 7 layers | 5 layers | 5 layers |
| | Barrier material | | | | | | | | | |
| | Base resin | | MXD6I (6) | MXD6I (6) | MXD6I (6) | MXD6I (6) | MXD6I (6) | MXD6I (50) | MXD6I (6) | MXD6I (6) |
| | Plate-shaped talc | | | PAOG-2 | PAOG-2 | PAOG-2 | PAOG-2 | PAOG-2 | | PAOG-2 |
| | Raw material aspect ratio | | | 45 | 45 | 45 | 45 | 45 | | 45 |
| | Added amount of filler | mass % | 0 | 10 | 30 | 50 | 70 | 30 | 0 | 30 |
| Paper container | Openability | | A | A | A | A | B | A | A | A |
| | Oxidation degradation suppression effect | | D | C | B | A | A | B | D | B |
| | Maximum length to maximum width ratio of plate-shaped filler | $R^0$ | | 14.8 | 14.0 | 13.4 | 13.0 | 14.9 | | 14.8 |
| | | $R^{45}$ | | 14.1 | 13.2 | 12.7 | 12.6 | 14.3 | | 14.2 |
| | | $R^{90}$ | | 13.4 | 12.7 | 12.2 | 12.0 | 13.7 | | 13.5 |
| | | $R^{max}$ | | 14.8 | 14.0 | 13.4 | 13.0 | 14.9 | | 14.8 |
| | Proportion X of number of plate-shaped talc particles with R more than 9 | % | | 7.9 | 7.8 | 7.7 | 7.5 | 7.8 | | 7.8 |

In the above table, the 7 layers mean an LDPE layer/an adhesive PE layer/a layer formed from the resin composition/an adhesive PE layer/an LDPE layer/a paper substrate/an LDPE layer. Further, the 5 layers mean an LDPE layer/an adhesive PE layer/a layer formed from the resin composition/a paper base material/an LDPE layer.

As is clear from the above results, when a paper laminate is produced using the resin composition of the present mission rate $OTR^{60}$ of the resin composition measured at a relative humidity of 60% and a temperature of 23° C. to the oxygen transmission rate $OTR^{60'}$ of a composition (Reference Examples 40 and 41, barrier resin only) obtained by removing the plate-shaped talc from the resin composition measured according to ASTM D3985 at a relative humidity of 60% and a temperature of 23° C.

TABLE 6

| | | | Reference Example 40 | Example 40 | Example 41 | Example 42 | Example 43 | Reference Example 41 | Example 44 |
|---|---|---|---|---|---|---|---|---|---|
| Raw Material | Barrier material thickness | μm | 30 | 30 | 30 | 30 | 30 | 30 | 30 |
| | Barrier material | | | | | | | | |
| | Base resin | | MXD6I (6) | MXD6I (6) | MXD6I (6) | MXD6I (6) | MXD6I (6) | MXD6I (50) | MXD6I (50) |
| | Filler grade | | | PAOG-2 | PAOG-2 | PAOG-2 | PAOG-2 | | PAOG-2 |
| | Added amount of filler | mass % | 0 | 10 | 20 | 30 | 50 | 0 | 30 |
| Resin foam | Barrier property improvement rate ($OTC^{60'}/OTC^{60}$) | Fold | 1.0 | 1.6 | 2.1 | 3.4 | 6.4 | 1.0 | 3.0 |
| | Maximum length to maximum width ratio of plate-shaped filler | $R^0$ | | 14.6 | 14.3 | 14.1 | 13.6 | | 14.2 |
| | | $R^{45}$ | | 13.9 | 13.5 | 13.4 | 12.5 | | 13.7 |
| | | $R^{90}$ | | 13.1 | 12.8 | 12.7 | 12.1 | | 12.9 |
| | | $R^{max}$ | | 14.6 | 14.3 | 14.1 | 13.6 | | 14.2 |
| | Proportion X of number of plate-shaped talc particles with R more than 9 | % | | 7.9 | 7.8 | 7.8 | 7.7 | | 7.8 |

As is clear from the above results, when a pseudo resin foam multilayer body was produced using the resin composition of the present invention (when the plate-shaped talc contained in the barrier resin layer satisfies a specific maximum length to minimum width ratio $R^{max}$), a pseudo resin foam multilayer body having a remarkably improved oxygen barrier property under high humidity was obtained (comparison between Examples 40 to 44 and Reference Examples 40 and 41).

Multilayer Cup (Examples 25 to 27)

<Production of Cup>

A multilayer extrusion apparatus equipped with three extruders, a feed block, and a T-die was used. A barrier resin and plate-shaped talc were blended in a composition shown in Table 7, and the resin composition was extruded from the first extruder at 250° C. In addition, polypropylene (product name: Novatec, grade: FY6, available from Japan Polypropylene Corporation) was extruded from the second extruder at 230° C., and an adhesive resin (product name: Admer, Grade: QB515, available from Mitsui Chemicals, Inc.) was extruded from the third extruder at 220° C. The molten resins extruded from the first to third extruders were supplied to the feed block, extruded from the T-die onto the cooling roll at 30° C., and wound up. The multilayer sheet obtained here has a three-type five-layer structure in the order of a polypropylene layer/an adhesive resin layer/a barrier resin layer/an adhesive resin layer/a polypropylene layer from the outer layer. The thickness of each layer was 440/10/100/10/440 (μm).

Next, using a compressed air vacuum forming machine (available from Asano Laboratories Co., Ltd.) equipped with plug assist, compressed air vacuum forming was performed when the sheet surface temperature reached the temperature shown in Table 7, thereby producing a multilayer container having an opening of 79 mm square×bottom 63 mm×depth 25 mm, a surface area of 110 cm², and a volume of 100 mL. The results are shown in Table 7.

In Examples 25 to 26, Grivory G21 (available from EMS-CHEMIE (Japan) Ltd.), which is a barrier resin and an amorphous resin, was used as an additive resin.

<Oxygen Transmission Rate of Cup>

The oxygen transmission rate of the multilayer containers prepared in Example 22 and Examples 25 to 27 was evaluated as follows.

The oxygen transmission rate of the multilayer container was measured using an oxygen transmission rate measuring device according to ASTM D3985. The multilayer container was filled with 20 mL of distilled water through the opening thereof, and the opening was sealed by heat welding with an aluminum foil laminated film. Two holes were made in the aluminum foil laminated film, a copper tube was inserted and hardened with epoxy resin. Thereafter, it was connected to an oxygen transmission rate measuring device and measured in an atmosphere of 23° C., an internal relative humidity of 100%, and an external relative humidity of 50%.

The oxygen transmission rate (OTR) was measured using an oxygen transmission rate measuring device (product name: "OX-TRAN (trade name) 2/21", available from MOCON Inc.).

<Visibility of Cup Content>

The content visibility of the multilayer containers prepared in Example 22 and Examples 25 to 27 was evaluated. The results of content visibility are classified and shown as follows.

A: The contents can be visually recognized without any problem.
B: The visibility of the contents is poor, but the presence or absence of the contents can be visually recognized.
C: The visibility of the contents is poor, and the presence or absence of the contents cannot be visually recognized.

TABLE 7

| | | | Example 22 | Example 25 | Example 26 | Example 27 |
|---|---|---|---|---|---|---|
| Raw Material | Barrier material thickness | % | 10 | 10 | 10 | 10 |
| | Barrier material | | | | | |
| | Base resin | | MXD6I (6) | MXD6I (6) | MXD6I (6) | MXD6I (6) |
| | Plate-shaped talc | | PAOG-2 | PAOG-2 | PAOG-2 | PAOG-2 |
| | Added amount of filler | mass % | 30 | 30 | 30 | 30 |
| | Type of additive resin | | | G21 | G21 | |

TABLE 7-continued

|  |  |  | Example 22 | Example 25 | Example 26 | Example 27 |
|---|---|---|---|---|---|---|
|  | Added amount of additive resin | mass % |  | 10 | 10 |  |
|  | Surface temperature of sheet during cup production | ° C. | 200 | 200 | 160 | 160 |
|  | Difference between glass transition temperature of base resin of barrier material and surface temperature of sheet during cup production | ° C. | 108 | 108 | 68 | 68 |
| Cup | Oxygen transmission rate at 23° C., 100% RH/50% RH | cc/package · day · 0.21 atm | 0.0005 | 0.0005 | 0.0005 | — |
|  | Maximum length to maximum width ratio of plate-shaped filler | $R^0$ | 14.0 | 14.0 | 14.0 | — |
|  |  | $R^{45}$ | 13.1 | 13.1 | 13.1 | — |
|  |  | $R^{90}$ | 12.7 | 12.7 | 12.7 | — |
|  |  | $R^{max}$ | 14.0 | 14.0 | 14.0 | — |
|  | Proportion X of number of plate-shaped talc particles with R more than 9 | % | 7.8 | 7.8 | 7.8 | — |
|  | Visibility of cup contents |  | A | A | A | B |

As is clear from the above results, when a crystalline resin was used as the base resin in the resin composition of the present invention, by adding the barrier and amorphous resin (6I/6T) in a case of being used for a cup, a cup having excellent content visibility and oxygen transmission rate was obtained under a wide range of production conditions. The reason is likely that the addition of the amorphous resin delays the crystallization of the resin composition during cup production and improves the secondary processability.

The invention claimed is:

1. A compressed air vacuum molded article which is formed from a resin composition or is formed from the resin composition and other material;
    the compressed air vacuum molded article having a multilayer body including, in the following order, a polyolefin layer/an adhesive resin layer/a barrier resin layer/an adhesive resin layer/a polyolefin layer;
    wherein the barrier resin layer is formed from the resin composition,
    wherein the resin composition comprises a resin component and a plate-shaped talc having an aspect ratio of 35 or more and 60 or less and a specific surface area of 2.0 m²/g or more and 20 m²/g or less, the resin component and the plate-shaped talc accounting for 90 mass % of the resin composition,
    the resin component comprising a barrier resin having an oxygen transmission coefficient of 5.0 cc·mm/(m²·day·atm) or less as measured according to ASTM D3985 at a relative humidity of 60% and a temperature of 23° C., and
    the barrier resin comprises a xylylenediamine-based polyamide resin (A) and an amorphous polyamide resin, the xylylenediamine-based polyamide resin (A) comprising a diamine-derived structural unit and a dicarboxylic acid derived structural unit,
    70 mol % or more of the diamine-derived structural units are derived from xylylenediamine, the dicarboxylic acid-derived structural unit includes an isophthalic acid-derived structural unit in a range of more than 0 mol % and less than 40 mol %, and the xylylenediamine-based polyamide resin (A) further comprises a structural unit derived from an α,ω-linear aliphatic dicarboxylic acid having from 4 to 20 carbon atoms; and
    a content of the plate-shaped talc being from 15.0 to 35.0 mass % when a total of the barrier resin and plate-shaped talc is 100 mass %;
    wherein $OTC^{90}/OTC^{60}$, which is the ratio of oxygen transmission coefficient $OTC^{90}$ of the resin composition measured according to ASTM D3985 at a relative humidity of 90% and a temperature of 23° C. to the oxygen transmission coefficient $OTC^{60}$ of the resin composition measured according to ASTM D3985 at a relative humidity of 60% and a temperature of 23° C., is 1.5 or less.

2. The compressed air vacuum molded article according to claim 1, which is obtained by compressed air vacuum forming the resin composition or the resin composition and other material.

3. The compressed air vacuum molded article according to claim 1, wherein $OTC^{90'}/OTC^{90}$, which is the ratio of oxygen transmission coefficient $OTC^{90'}$ of a composition obtained by removing the plate-shaped talc from the resin composition measured according to ASTM D3985 at a relative humidity of 90% and a temperature of 23° C. to the oxygen transmission coefficient $OTC^{90}$ of the resin composition measured according to ASTM D3985 at a relative humidity of 90% and a temperature of 23° C., is 1.5 or more.

4. The compressed air vacuum molded article according to claim 1, which is a cup, a tray, or a cooked rice container.

5. The compressed air vacuum molded article according to claim 3, which is obtained by compressed air vacuum forming the resin composition or the resin composition and other material.

6. The compressed air vacuum molded article according to claim 3, which is a cup, a tray, or a cooked rice container.

* * * * *